United States Patent
Flynn

(10) Patent No.: US 9,061,484 B2
(45) Date of Patent: *Jun. 23, 2015

(54) LABEL ASSEMBLY HAVING REGISTRATION STRUCTURES FOR APPLYING A LABEL TO AN OBJECT

(75) Inventor: Timothy J. Flynn, Key Largo, FL (US)

(73) Assignee: Continental Datalabel, Inc., Elgin, IL (US)

(*) Notice: Subject to any disclaimer, the term of this patent is extended or adjusted under 35 U.S.C. 154(b) by 358 days.

This patent is subject to a terminal disclaimer.

(21) Appl. No.: 13/011,022

(22) Filed: Jan. 21, 2011

(65) Prior Publication Data

US 2011/0186213 A1   Aug. 4, 2011

Related U.S. Application Data

(63) Continuation-in-part of application No. 12/581,660, filed on Oct. 19, 2009, now Pat. No. 8,273,433, which is a continuation-in-part of application No. 12/426,816, filed on Apr. 20, 2009, now Pat. No. 8,171,661, and a continuation-in-part of application (Continued)

(51) Int. Cl.
| | |
|---|---|
| *C09J 7/02* | (2006.01) |
| *B32B 37/02* | (2006.01) |
| *B32B 37/12* | (2006.01) |
| *B32B 37/16* | (2006.01) |
| *B32B 38/10* | (2006.01) |
| *B65C 1/00* | (2006.01) |
| *B65C 3/00* | (2006.01) |

(52) U.S. Cl.
CPC ............. *B32B 37/02* (2013.01); *Y10T 428/14* (2015.01); *B32B 37/12* (2013.01); *B32B 37/16* (2013.01); *B32B 38/10* (2013.01); *B65C 1/00* (2013.01); *B65C 3/00* (2013.01); *C09J 7/02* (2013.01)

(58) Field of Classification Search
CPC ..... B42D 15/045; B42P 2241/22; G09F 3/10; G09F 3/18; G09F 3/02; B65C 1/00; B65C 3/00; B32B 38/10; B32B 37/16; B32B 37/02; B32B 37/12; C09J 7/02; Y10T 428/14
See application file for complete search history.

(56) References Cited

U.S. PATENT DOCUMENTS

| | | | | |
|---|---|---|---|---|
| 4,394,904 | A * | 7/1983 | Larimore | 206/447 |
| 4,454,180 | A | 6/1984 | La Mers | |
| 4,505,770 | A * | 3/1985 | Larimore | 156/235 |
| 4,821,439 | A * | 4/1989 | Wilck | 40/638 |
| 5,705,245 | A | 1/1998 | Loemker et al. | |
| 6,073,377 | A | 6/2000 | Mehta | |
| 6,375,065 | B1 * | 4/2002 | Flynn et al. | 229/69 |
| 6,479,118 | B1 | 11/2002 | Atkinson | |

(Continued)

OTHER PUBLICATIONS

Co-pending U.S. Appl. No. 12/818,638, Flynn et al., "Label Assembly for Applying a Label to Electronic Devices," filed Jun. 18, 2010.

*Primary Examiner* — Patricia L Nordmeyer
(74) *Attorney, Agent, or Firm* — Pauley Petersen & Erickson

(57) ABSTRACT

A label assembly that includes a face sheet with a label shape defined by one or more tearable lines of separation, a back sheet adjacent to the face sheet, and an adhesive material disposed between the face sheet and the back sheet. The back sheet has a removable panel disposed over the label shape adhesive material and a registration structure that is or can be aligned with the label shape. The registration structure is adherable to an exposed portion of the adhesive material that is adjacent to a portion of the label shape.

21 Claims, 20 Drawing Sheets

Related U.S. Application Data

No. 12/426,823, filed on Apr. 20, 2009, now Pat. No. 8,272,669, said application No. 12/426,816 is a continuation-in-part of application No. 11/716,388, filed on Mar. 9, 2007, now Pat. No. 7,726,696, which is a continuation-in-part of application No. 11/585,654, filed on Oct. 24, 2006, now Pat. No. 7,959,187, application No. 13/011,022, which is a continuation-in-part of application No. 12/581,672, filed on Oct. 19, 2009, now Pat. No. 8,419,070, which is a continuation-in-part of application No. 12/426,816, and a continuation-in-part of application No. 12/426,823, said application No. 12/426,816 is a continuation-in-part of application No. 11/716,388, which is a continuation-in-part of application No. 11/585,654.

(60) Provisional application No. 61/297,160, filed on Jan. 21, 2010.

(56) References Cited

U.S. PATENT DOCUMENTS

| | | | |
|---|---|---|---|
| 6,776,866 B2 * | 8/2004 | Flynn et al. | 156/247 |
| 6,837,955 B1 * | 1/2005 | McCarthy et al. | 156/248 |
| 7,140,136 B2 | 11/2006 | Flynn et al. | |
| 7,726,696 B2 | 6/2010 | Flynn et al. | |
| 7,874,594 B2 | 1/2011 | Flynn et al. | |
| 7,959,187 B2 | 6/2011 | Flynn et al. | |
| 7,963,564 B2 | 6/2011 | Flynn et al. | |
| 8,171,661 B2 * | 5/2012 | Flynn et al. | 40/638 |
| 8,507,065 B2 * | 8/2013 | Milson | 428/40.1 |
| 2001/0025689 A1 | 10/2001 | Barnet | |
| 2004/0137198 A1 | 7/2004 | Flynn et al. | |
| 2004/0137199 A1 | 7/2004 | Flynn et al. | |
| 2005/0178506 A1 | 8/2005 | Flynn et al. | |
| 2005/0193608 A1 * | 9/2005 | Flynn et al. | 40/638 |
| 2006/0010742 A1 | 1/2006 | Steininger | |
| 2006/0011076 A1 | 1/2006 | Durban | |
| 2006/0032764 A1 | 2/2006 | Swenson | |
| 2006/0037507 A1 | 2/2006 | Trigg et al. | |
| 2009/0295140 A1 | 12/2009 | Flynn et al. | |
| 2009/0295143 A1 | 12/2009 | Flynn et al. | |
| 2010/0102544 A1 | 4/2010 | Flynn | |
| 2010/0102545 A1 | 4/2010 | Flynn | |
| 2010/0237604 A1 | 9/2010 | Flynn et al. | |

* cited by examiner

LABEL ASSEMBLY HAVING REGISTRATION STRUCTURES FOR APPLYING A LABEL TO AN OBJECT

CROSS REFERENCE TO RELATED APPLICATIONS

This application claims the benefit of U.S. Provisional Patent Application Ser. No. 61/297,160, filed 21 Jan. 2010, and is a continuation-in-part of each of: U.S. application Ser. No. 12/581,660, which is a continuation-in-part of U.S. application Ser. Nos. 12/426,816 and 12/426,823, both filed on 20 Apr. 2009, which are each a continuation-in-part of U.S. application Ser. No. 11/716,388, filed on 9 Mar. 2007, which is a continuation-in-part of U.S. application Ser. No. 11/585,654, filed on 24 Oct. 2006; and U.S. application Ser. No. 12/581,672, which is a continuation-in-part of U.S. application Ser. Nos. 12/426,816 and 12/426,823, both filed on 20 Apr. 2009, which are each a continuation-in-part of U.S. application Ser. No. 11/716,388, filed on 9 Mar. 2007, which is a continuation-in-part of U.S. application Ser. No. 11/585,654, filed on 24 Oct. 2006. The co-pending applications are hereby incorporated by reference herein in their entirety and are made a part hereof, including but not limited to those portions which specifically appear hereinafter.

FIELD OF THE INVENTION

This invention is directed to a label assembly for application of a label to an object having a planar and/or a non-planar surface, e.g., an electronic music player or other MP3 player, a personal digital assistant, tablet device, laptop, handheld game, book reader, a cell phone, etc. The invention is also directed to a printable sheet of such labels, and a method for printing and/or applying the printed labels, such as by a consumer.

SUMMARY OF THE INVENTION

The label assembly of this invention allows for aligning and applying a label to an object, for example, an object having two or more surfaces at an angle to one another. The label assembly of this invention is particularly useful in applying a label that has an intricate/uneven surface and/or is to be wrapped around an object, such as for decorating or personalizing small consumer electronics such as music players and cell phones. The label assembly and method of this invention provide correct alignment of the label on the object to be labeled without the need for a separate label application apparatus.

A general object of the invention can be attained, at least in part, through a label assembly including a face sheet with at least one label shape defined by at least one tearable line of separation, a back sheet adjacent to the face sheet, and an adhesive material disposed between the face sheet and the back sheet. The label assembly further includes a removable panel of the back sheet disposed over the label shape and a registration structure that is adherable to exposed adhesive material that is adjacent the portion of the label shape beneath the removable panel. The registration structure can be formed from or applied to the label assembly, and desirably forms a three-dimensional and/or box-like shape. The registration structure desirably has a polyhedron or polyhedral tube shape.

The registration structure can be formed from a portion of the label assembly, such as defined by at least one tearable line of separation in the back sheet. The registration structure can also be a structure that is independent, separate, and/or distinct from the label assembly, and placed on the label assembly in a desired position to act as a registration or guide structure for the object to be labeled. The registration structure is placed on, formed in, or raised from the label assembly in a position aligned with at least a portion of the label shape, and held in the operable position by temporarily adhering the registration structure to an exposed portion of the adhesive material.

The invention further comprehends a label assembly. The label assembly includes a face sheet having a printed or printable surface, a label shape defined in the face sheet by at least one first tearable line of separation, an adhesive material coating a surface of the face sheet opposite the printed or printable surface, and a back sheet disposed over the adhesive material. The back sheet includes a back sheet surface opposite the adhesive material and a removable panel defined in the back sheet by at least one second tearable line of separation and disposed over the label shape. The registration structure includes a tab is formed in at least the back sheet. The tab includes a plurality of fold lines forming foldable portions. When the tab is raised above the back sheet surface during use, the tab is folded to form a wall or box adjacent the removable panel. In the raised position, the registration structure can include a registration tab portion, a first foldable panel portion aligned with and facing the removable panel of the exposed adhesive that was beneath the removable panel, and a second foldable panel portion that extends at an angle from the first foldable portion. The second foldable panel portion may extend in a direction away from the removable panel, or the exposed adhesive there under, and at least approximately parallel to the tab portion or the face sheet.

The registration structure can also include foldable portions that fold to form a box-like or polyhedral tube structure. Various configurations of this registration structure are available. Desirably a solid side wall of the registration structure will be aligned adjacent to, either perpendicular to or angled away from, the removable panel or exposed adhesive as a registration surface, but an open end of the folded registration structure can alternatively be disposed facing the removable panel or exposed adhesive. The registration structure can be folded and formed with the open end faces disposed parallel or perpendicular to the flat label assembly.

In another embodiment of this invention, the registration structure is a separate structure from the label assembly. The back sheet includes a first removable panel over the position where the object to be labeled will be placed. The back sheet further includes at least one second removable panel that is aligned with the first removable panel. The second panel can be removed to expose adhesive on the face sheet. The registration structure, which can be a block or equivalent structure, is temporarily adhered to a corresponding portion of the exposed adhesive to form a registration structure for guiding the alignment of the object during labeling.

The number and positions of the various registration structures as discussed above can vary depending on need. In one embodiment, registration structures are disposed on opposite sides of the label portion or removable panel. One or more further structures, generally referred to as alignment structures, can be disposed on perpendicular sides as well.

The invention still further comprehends a method for labeling an object. The method uses the label assembly of this invention, such as described above, that includes a registration structure aligned with at least a portion of a label shape and a removable panel. The method begins with optionally placing the label assembly on a surface with the face sheet downward on the surface. A first panel portion of the removable panel is removed to expose adhesive material on a first portion of the label shape. The registration structure is positioned on, and desirably partially held by temporary adhesion to, an exposed portion of the adhesive material. The object is then placed against the registration structure and the label shape is adhered to the first portion of the label shape by placing the object on the exposed adhesive material while the object is against the registration structure. A second panel portion of the removable panel is removed to expose the adhesive material on a second portion of the label shape and the second portion of the label shape is applied to the object. The object is removed with the adhered label shape from the label assembly.

The registration structure can be formed by raising and folding a portion of the back sheet, or by temporarily adhering a separate and independent registration structure to exposed adhesive material.

Other objects and advantages will be apparent to those skilled in the art from the following detailed description taken in conjunction with the appended drawings.

DETAILED DESCRIPTION OF EMBODIMENTS

Figure 1:
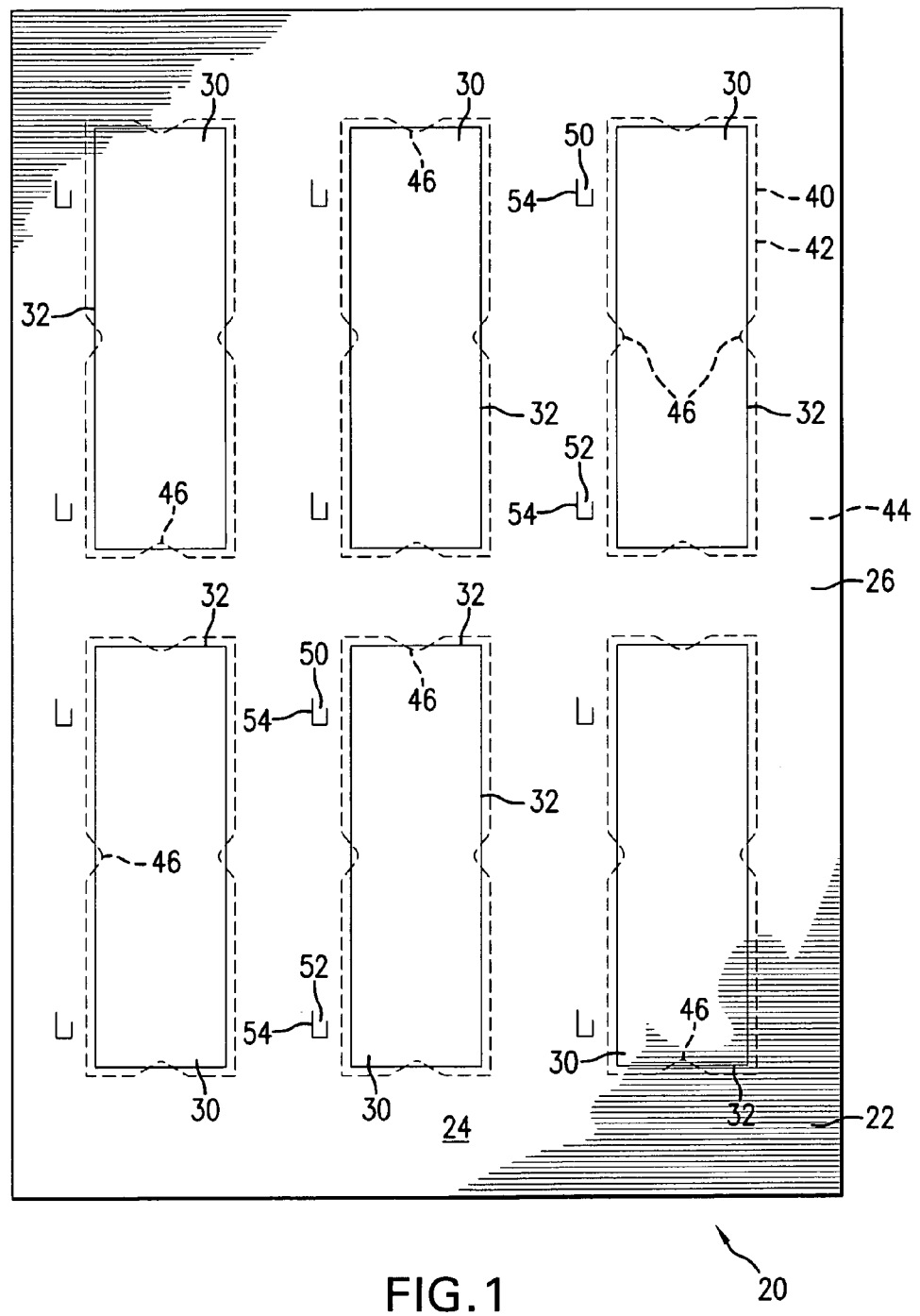
FIG. 1 is a plan view of a label assembly according to one embodiment of this invention.

FIG. 1 shows a label sheet 20 (not necessarily shown to scale) according to one embodiment of this invention. Label sheet 20 is desirably formed of a face sheet 22 and a back sheet (not shown in FIG. 1). The back sheet is desirably about the same size as the face sheet 22, but may be slightly larger or smaller than the face sheet 22. The surface of the face sheet 22 that is disposed toward the back sheet includes an adhesive material coating. The adhesive coating can include any adhesive material known and available to those skilled in the art for forming pressure sensitive, or self-adhesive, labels. The back sheet is desirably formed of a material to which the adhesive coating adheres significantly less than to the face sheet 22, such as is known for forming pressure sensitive, or self-adhesive, labels.

The sheet 20 is of any suitable shape, and generally any suitable size that can be accepted by and fed through a printer, such as a laser printer or an ink jet printer. Common sizes of paper generally fed through printers are 8.5 inches by 5.5 inches, 8.5 inches by 11 inches, 8.263 inches by 11.688 inches (A4 size), and 8.5 inches by 14 inches, however for label sheets such as shown in FIGS. 15-22 the size can be smaller. The face sheet 22 is preferably, but not necessarily, constructed of any suitable paper, paper composite, non-metal and/or metal material that can be used as a label. Other suitable materials for constructing the sheet 22 include fabric, plastic, and metal foils. The adhesive coating covered by the back sheet is applied to the face sheet 22 in any suitable manner known to those skilled in the art. The face sheet 22 desirably has a printable surface 24 on a side opposite the adhesive coating.

The face sheet and the printable surface 24 can be any of a variety of face materials used to make pressure sensitive or self-adhesive labels. Such face materials may include, but are not limited to: smudgeproof stock, litho stock, cast coated stock, tag stock, fluorescent stock, foils, computer printable polyester, vinyl, satin cloth, Tyvek™ material, flexible plastic, book papers, photo quality papers and/or photo quality film. Furthermore, various portions of the face materials can be different colors, thereby resulting in different colored parts.

The phrase "printable surface" relates to a surface of any type of matter upon which a person or machine can draw, print, color, paint, photocopy, write, emboss, or make any other type of mark or graphic. Laser printers, ink jet printers, impact printers, thermal transfer printers, direct thermal printers, typewriters, or any other suitable graphic printing devices are preferred but not necessary for use with printable surfaces according to this invention. The face sheet can also be pre-printed by the manufacturer or retailer with graphics and/or test desirable to a consumer user. The printed surface can include any desirably image or text, or can be colored or include holographic images.

The face sheet 22 includes a plurality of label shapes 30, each defining in the face sheet 22 an individual label according to this invention. The phrase "shape", or the phrase "removable or tearable shape", is intended to relate to a shape, such as, but not limited to, the rectangular shapes identified in FIG. 1 by element reference numerals 30, that can be torn away from a remaining portion 26 of the face sheet 22, by using tearable lines of separation 32. The term "tearable lines of separation," also referred to as simply "tearable lines," "lines of separation" or "separation lines," relate to physical or structural lines that can be torn to separate a removable portion or section from the remaining portion or section of the label and/or the label assembly according to this invention. The label portion of this invention may further include additional separation lines and/or lines of weakness and/or fold lines to aid in positioning and/or adhering the label around an object. Lines of separation and/or lines of weakness according to this invention can be formed of a die-cut line, a laser die-cut line, a score cut line, a perforation line (such as having a plurality of cuts and ties), a microperforation line, a chemically etched line, a liquid etched line, a gas etched line, or any combination of these types of separation, or any other suitable structure that enables separation. A preferred type of tearable line 32 is a line that is die-cut. The label shapes 30 can be die-cut along at least a portion of a periphery, such that the label shapes 30 can be easily removed or separated from the remaining portion 26 of the sheet 22, for example after the sheet 22 is run through a printer.

The back sheet includes a removable panel 40 shown in phantom. The removable panel is defined by tearable lines of separation (shown as dashed lines 42 in FIG. 1) in a surface of the back sheet that is disposed opposite the front sheet 22. A removable panel 40 is disposed over the adhesive coated side of each label shape 30. In the embodiment shown in FIG. 1, the removable panel 40 is desirably and optionally sized slightly larger than the label shape 30. A remaining portion 44 of the back sheet that is disposed around, and desirably surrounding, the removable panel 40 includes a plurality of retainer tabs 46 extending from the remaining portion 44 and adhering to the label shape 30.

The label sheet 20 includes a registration structure, embodied in FIG. 1 as two spaced apart tabs 50 and 52, aligned with each label shape 30 and the removable panel 40. As will be described in more detail below, the registration structure of this invention allows for improved and easier application of a label to an object with a non-planer surface, for example, a pen or a pencil. In the embodiment of FIG. 1, the tabs 50 and 52 are each defined on three sides by a tearable line of separation 54 in both the back sheet and the face sheet 22. The tabs 50 and 52 are raisable to an extended position by folding outward above the back sheet.

Figure 2:
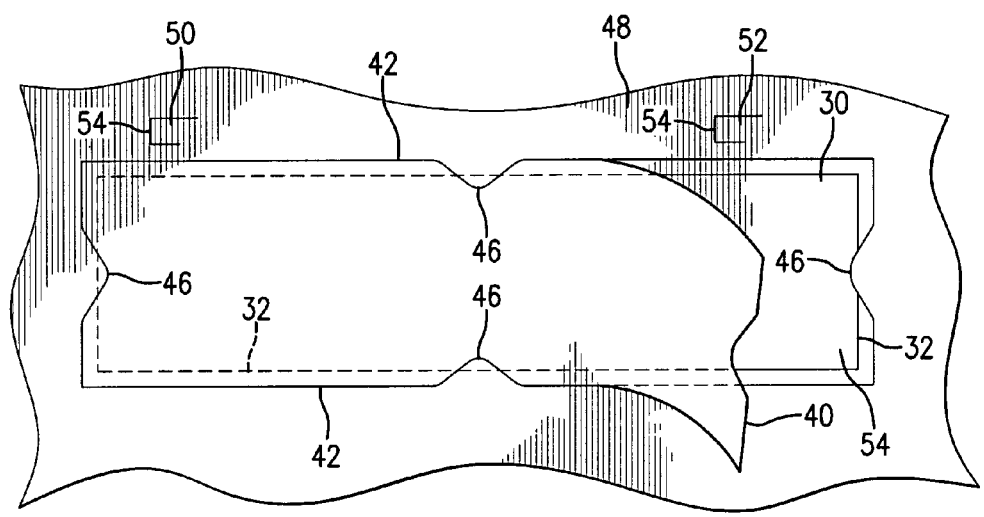
FIG. 2 is a plan view of a portion of the label assembly of FIG. 1, viewed from an opposite side.
Figure 3:
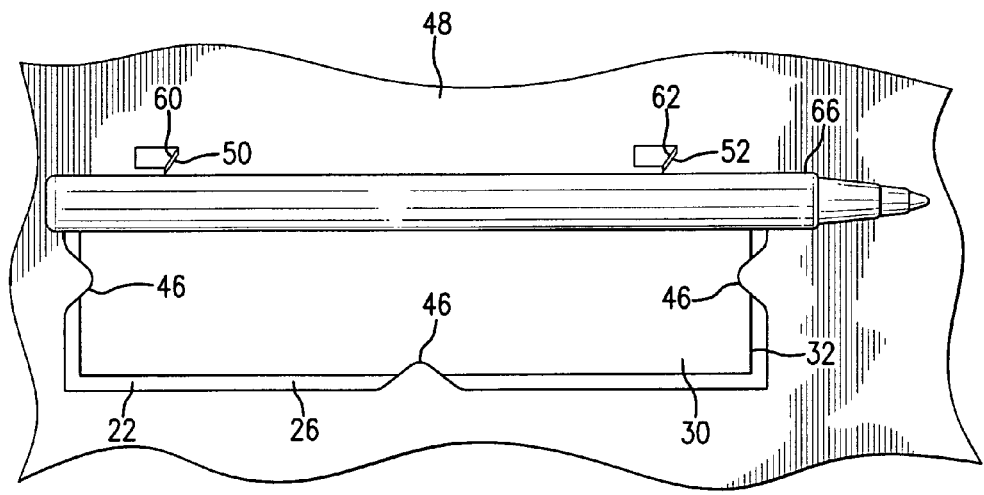
FIGS. 3 and 4 illustrate an operation of the label assembly of FIG. 1.
Figure 4:
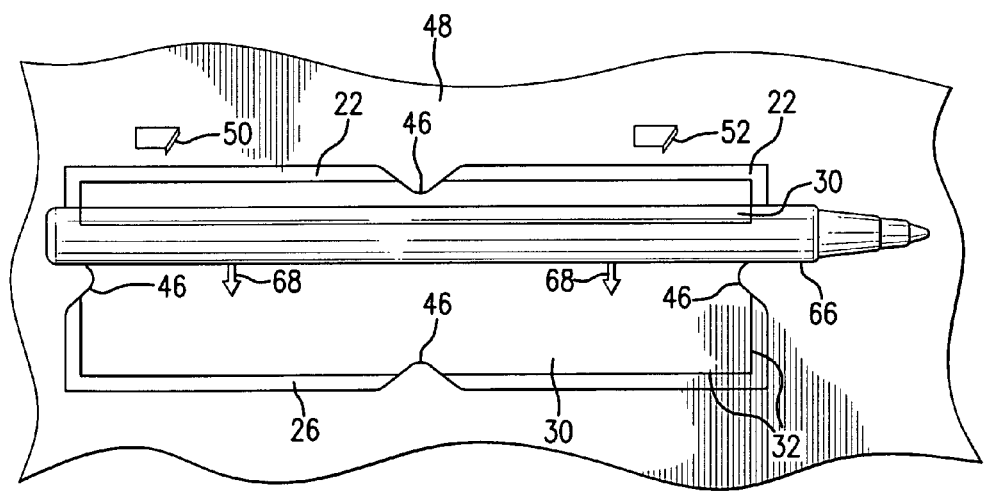

FIGS. 2-4 illustrate the operation of the label sheet 20 of FIG. 1 for labeling an object having a non-planar surface, shown as a pen. Desirably first, the label sheet 20 is routed through a printer to print text and/or graphics onto the printable surface 24 of at least one label shape 30. FIG. 2 shows a printed label shape 30 of sheet 20 placed with the printed face sheet 22 downward on a surface. The removable panel 40 of back sheet 48 is removed along lines of separation 42 to expose the adhesive material 54 on the non-printed side of the label shape 30.

As shown in FIGS. 3 and 4, the tabs 50 and 52 of the registration structure are raised by the user above the surface of the back sheet 48. The tabs 50 and 52 are raised by folding along fold lines 60 and 62, respectively. FIG. 3 shows the label sheet 20 with the removable panel 40 removed and a pen 66 placed against the tabs 50 and 52. As discussed above, desirably the tabs 50 and 52 are formed by one or more die cuts that extend through both of the back sheet 48 and the face sheet 22, thereby desirably providing increased tab thickness and thus rigidity for receiving the pen 66 there against. With the pen 66 against the raised tabs 50 and 52, the pen may or may not be in contact with the adhesive material on the label shape 30 and/or the remaining portion 26. The tabs 50 and 52 desirably assist the user in positioning the pen 66 in proper alignment with the label shape 30 to promote or provide a desirable straight label application. The retainer tabs 46 assist in maintaining the label shape 30 within the face sheet 22 upon removing the removable panel 40 and during positioning of the pen 66 against the tabs 50 and 52.

To apply the label shape 30 to the pen 66, the pen 66 is rolled by the user from the tabs 50 and 52 across the label shape 30, in the direction shown by arrows 68 in FIG. 4. As the pen 66 is rolled, the adhesive material 54 of the label shape 30 adheres to the cylindrical shaft of the pen 66, thereby separating and removing the label shape 30 from the face sheet 22 and adhering the label shape 30 around the pen 66.

The removable panel and the registration structure of this invention allow for relatively easier and better placement of a label onto a rounded or otherwise non-planar surface. As will be appreciated by those skilled in the art following the teachings herein provided, various and alternative sizes, shapes, and configurations are available for the labels, removable panels, and registration structures according to this invention, such as, without limitation, shown in FIGS. 5 and 6.

Figure 5:
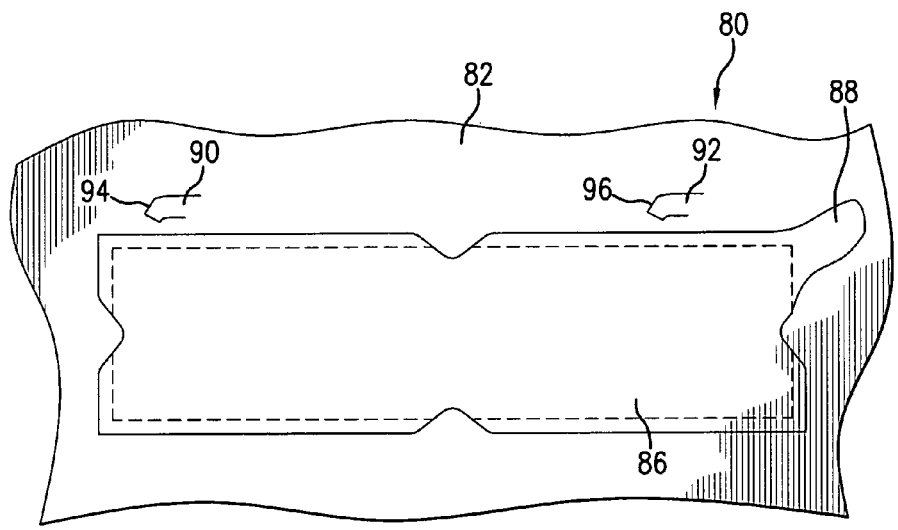
FIG. 5 is a plan view of a portion of a label assembly according to another embodiment of this invention.

FIG. 5 illustrates a portion of a label sheet 80, viewed from the back sheet 82, according to another embodiment of this invention. The label sheet 80 differs from the embodiment of FIG. 1 in the shape of tabs 90 and 92 of the registration structure and removable portion 86. In the embodiment of FIG. 5, the tabs 90 and 92 have bent portions 94 and 96, respectively, that can, for example, desirably form a flat edge that in the raised position is perpendicular to the back sheet 82 and against which a pen or similar object can be placed. In a similar embodiment, the tabs can be formed as hook-like tabs that include a portion that extends over and/or around a portion of the pen or pencil. Also in the embodiment of FIG. 5, the removable portion 86 includes a corner starter flap, or removal tab, 88 that is adapted to allow for easier removal of the removable panel 86 by the user.

Figure 6:
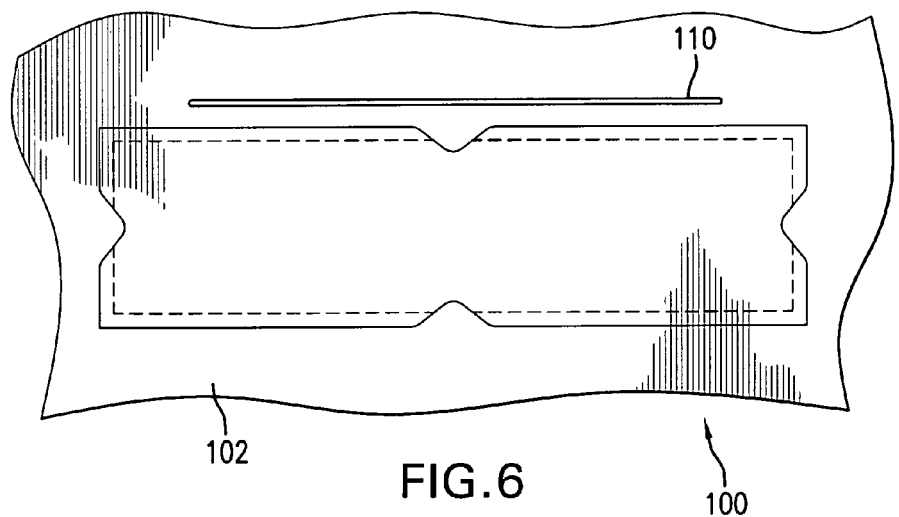
FIG. 6 is a plan view of a portion of a label assembly according to yet another embodiment of this invention.

Other structures than cut-out tabs are available for the registering structure according to this invention. In one embodiment, the registration structure comprises an embossed structure. FIG. 6 shows a label sheet 100 having an embossed structure according to one embodiment of this invention. In FIG. 6, the label sheet 100 includes a back sheet 102. A score line 110 is embossed into the label sheet 100 to provide a raised registration structure against which a pen or other object can be placed for alignment. Desirably, the score line 110 is only as high as is needed for the user to determine when an object is being placed against it. The score line 110 can be formed by scoring the face sheet of the label sheet 100 to cause the score line 110 to be raised above the flat back surface of the label sheet 100 (desirably without cutting through the label sheet 100). As will be appreciated, other embossed or raised shapes are available for the embossed registration structure of this invention, such as, for example, two or more raised domes. Any structure that is or can be raised above the label assembly of this invention, can be used as a registration structure for aligning an object, and is contemplated herein.

Figure 7:
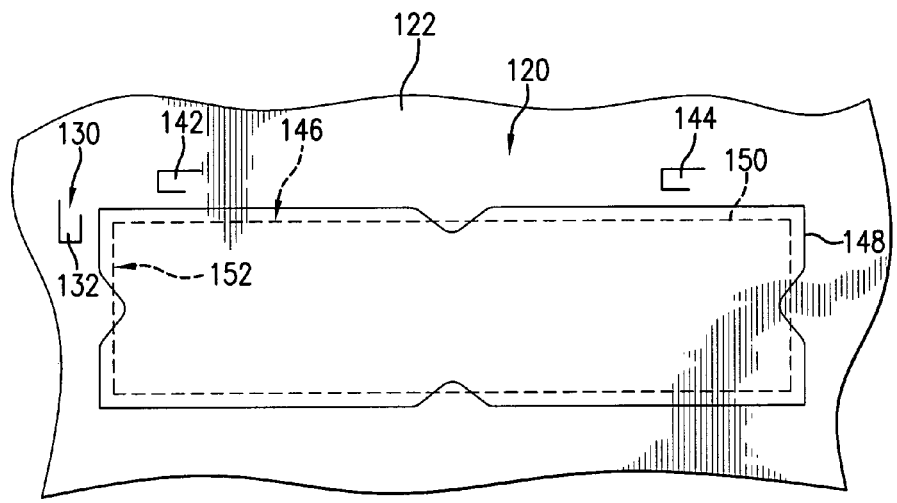
FIG. 7 is a plan view of a portion of a label assembly according to yet another embodiment of this invention.
Figure 8:
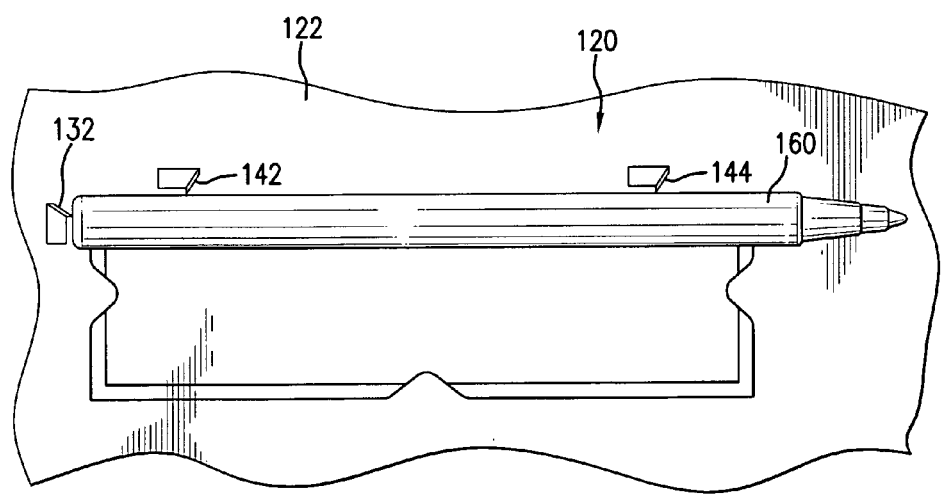
FIG. 8 illustrates an operation of the label assembly of FIG. 7.

FIGS. 7 and 8 illustrate a portion of a label sheet 120, viewed from the back sheet 122, according to another embodiment of this invention. The label sheet 120 differs from the embodiment of FIG. 1 by including an alignment structure 130 in addition to the tabs 142 and 144 forming the registration structure. The alignment structure 130 is formed of a single alignment tab 132, which in this embodiment of the invention is similar is size, shape and function to each of the registration structure tabs 142 and 144.

The registration structure tabs 142 and 144 are disposed adjacent a first side 146 of the label shape 150. The alignment tab 132 is disposed adjacent a second side 152 of label shape 150. As shown in FIG. 8, the alignment structure of this invention desirably acts as an end stop for the pen 160 when the alignment tab 132 is raised above the back sheet 122 by the user. The alignment structure desirably assists in obtaining consistent placement of the labels on the pen. As will be appreciated by those skilled in the art following the teachings herein provided, various sizes, shapes, placements and configurations are available for the alignment structure of this invention. For example, the additional configurations of the registration structure according to this invention, such as, for example, shown in FIGS. 5 and 6, are available for configuration as the alignment structure, depending on need and the object to be labeled. In another embodiment, more than one alignment tab can be placed along side 146, or two alignment tabs can be placed on opposing sides of a label.

Figure 9:
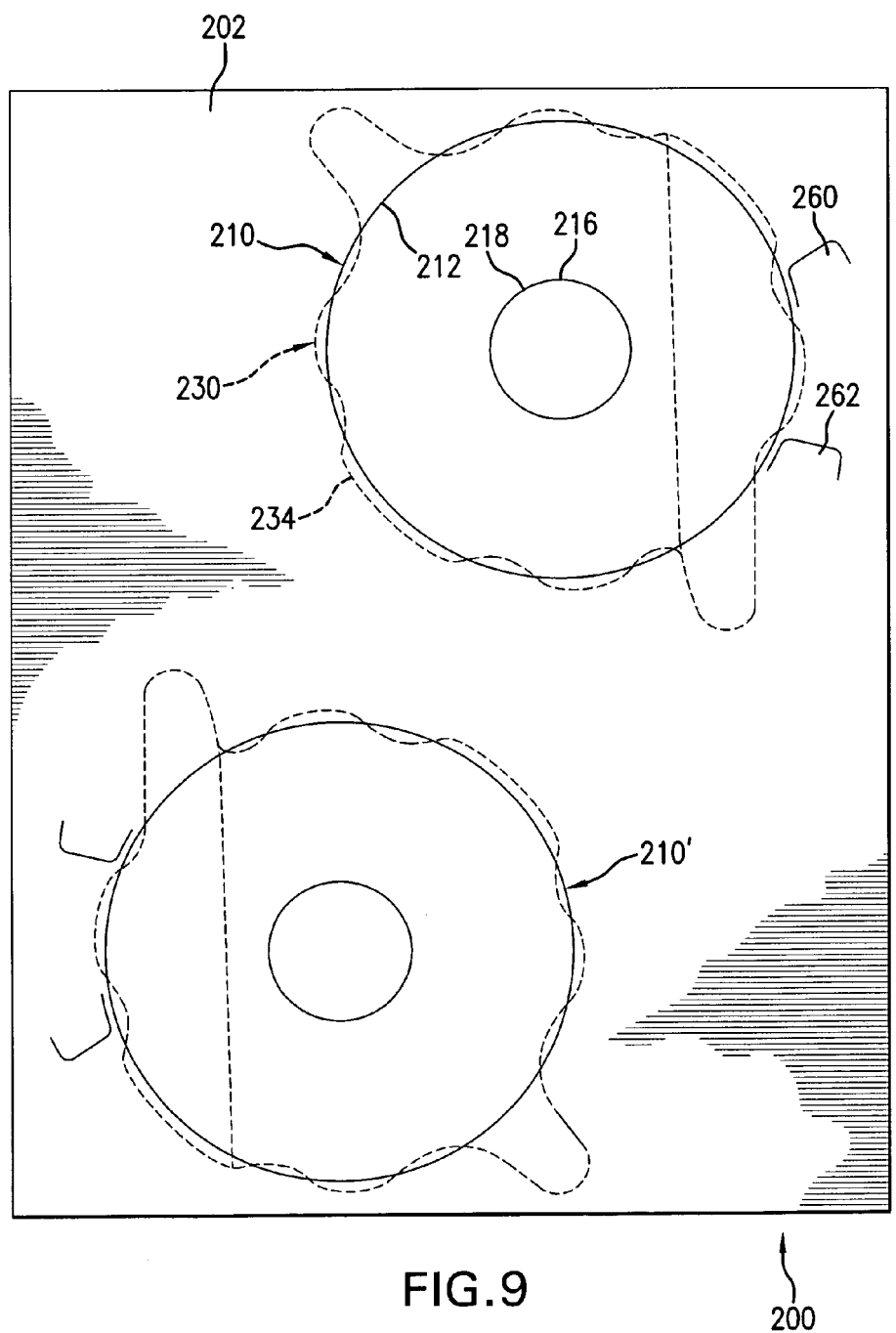
FIG. 9 is a plan view of a label assembly according to yet another embodiment of this invention.
Figure 10:
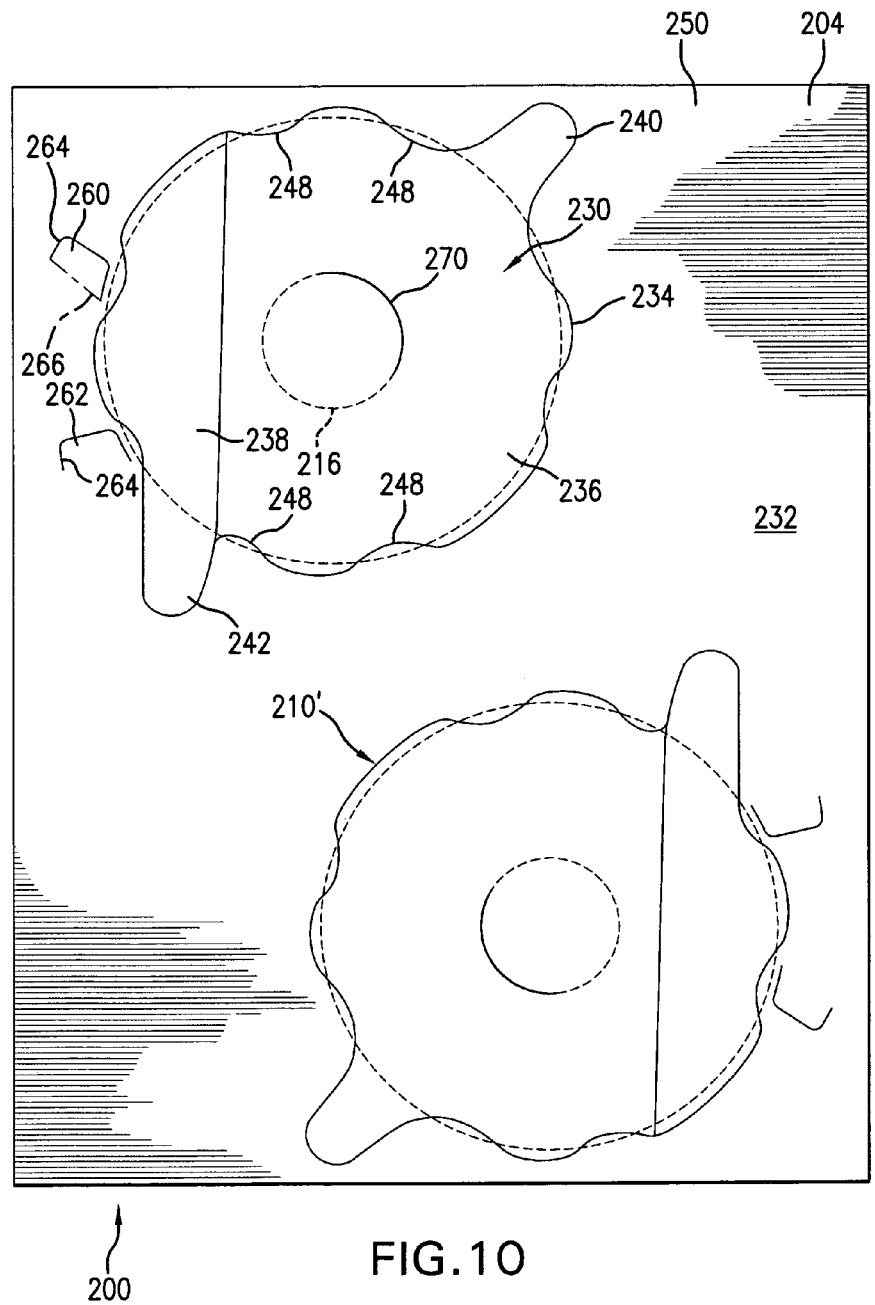
FIG. 10 is a plan view of the back side of the label assembly of FIG. 9.

FIGS. 9 and 10 show a label assembly 200 (not necessarily shown to scale) according to another embodiment of this invention. Label assembly 200 is desirably formed of a face sheet 202 having a printable surface, shown in the view of FIG. 9, and a back sheet 204, shown in the view of FIG. 10. The back sheet 204 is desirably about the same size as the face sheet 202, but may be slightly larger or smaller than the face sheet 202. The surface of the face sheet 202 that is disposed toward the back sheet 204, and opposite the printable surface, includes an adhesive material coating.

The label assembly 200 shown in FIGS. 9 and 10 includes two circular label shapes 210 and 210', which will be described herein with reference to label shape 210. The circular label shape 210 is defined in the face sheet 202 by a first tearable line of separation 212. The circular label shape 210 desirably has a diameter matched to, and preferably slightly smaller than, the diameter of a CD or DVD.

The label assembly 200 further includes a circle 216 cut within the face sheet 202 by a second tearable line 218 and positioned within the label shape 210, preferably positioned in a center position of the label shape 210. The second, smaller circle 216 is desirably approximately equivalent to either a diameter of an inner cut-out circle of the CD or DVD, or a diameter of an inner circle on the CD or DVD where a read/write portion of the CD or DVD adjoins a non-read/write portion of the CD or DVD. The area of label shape 210 between the two tearable lines 212 and 218 can be drawn upon, typed upon, or otherwise printed upon, such as when the sheet 200 is run through a printer, and can then be separated from the back sheet 204 to which the label shape 210 initially adheres. The label shape 210 can then be adhered to a non-read/write side of, for example, a CD or DVD.

The back sheet 204 includes a removable panel 230 defined in the back sheet surface 232 by at least one tearable line of separation 234. The removable panel 230 is disposed over the label shape 210, and as shown in FIGS. 9 and 10, is preferably generally coextensive the label shape 210. In the embodiment shown in FIGS. 9 and 10, the removable panel 230 is optionally divided into two sub-panels 236 and 238, which can assist in applying the label shape 210 to an object, for example, by allowing for only a portion of the removable panel 230 to be removed prior to a first adhesion of the label shape 210 to the object.

According to one preferred embodiment of this invention, the removable panel 230 includes two removal tabs 240 and 242 extending from a periphery of the back sheet removable panel 230. Removal tabs 240 and 242 are desirably positioned on opposing sides of the removable panel 230, such as shown in FIGS. 9 and 10. Removal tabs 240 and 242 are preferably shaped in such a manner so as to facilitate peeling away of removable panel 230. In this embodiment, removal tab 240 is associated with sub-panel 236 and removal tab 242 is associated with sub-panel 238. As will be appreciated, the different angling of removal tab 242, as compared to the angle of removal tab 240, facilitates the removal of the relatively narrow sub-panel 238. The back sheet 204 also includes a plurality of retainer tabs 248 extending from a remaining portion 250 and adhering to the label shape 210. As discussed above, the retainer tabs 248 are particularly useful in holding the label shape 210 in place (and attached to the remainder of the front sheet 202) while removing the removable panel 230 to expose the adhesive material on the label shape 210.

The label assembly 200 includes a registration structure, embodied in FIGS. 9 and 10 as two spaced apart registration tabs 260 and 262, aligned with the label shape 210. As will be described in more detail below, the registration structure of this embodiment allows for improved and easier application of a label to an object, for example, a CD or DVD. The tabs 260 and 262 are each defined on three sides by a tearable line of separation 264 in both the back sheet 204 and the face sheet 202. The tabs 260 and 264 are raisable to an extended position by folding outward above the back sheet 204. In FIG. 10, fold line 266 shows where the tab 260 will desirably be folded, and can be imaginary or a perforated or otherwise scored fold line.

According to one preferred embodiment of this invention, when the removable panel 230 is peeled away or otherwise removed from label shape 210, a center hole in label shape 210 is opened by the removal of the portion of the label assembly 200 within circle 216. In the embodiment of this invention shown in FIGS. 9 and 10, the center hole of label shape 210, defined by circle 216, may be opened upon removal of the removable panel sub-panel 236 using a die cut 270 extending partially along a perimeter of the circle 216 and in both face sheet 202 and back sheet 204. A similar use of such a die cut is described in commonly assigned U.S. Pat. No. 6,881,461, herein incorporated by reference.

The die cut 270 is preferably generally arcuate and positioned along a side of the circle 216 that corresponds with a side of the first circle 216 that is removed first. As shown in FIG. 10, the die cut 270 is disposed on the side of circle 216 toward the removal tab 240. According to an embodiment of die cut 270 having an arcuate shape, the arc preferably extends between approximately 1° and 180° along the circle 216 and more preferably extends between approximately 5° and 90° along the circle 216. Alternative designs for facilitating the removal of the portion of the label assembly 200 within circle 216 are also available for use in this invention.

Figure 11:
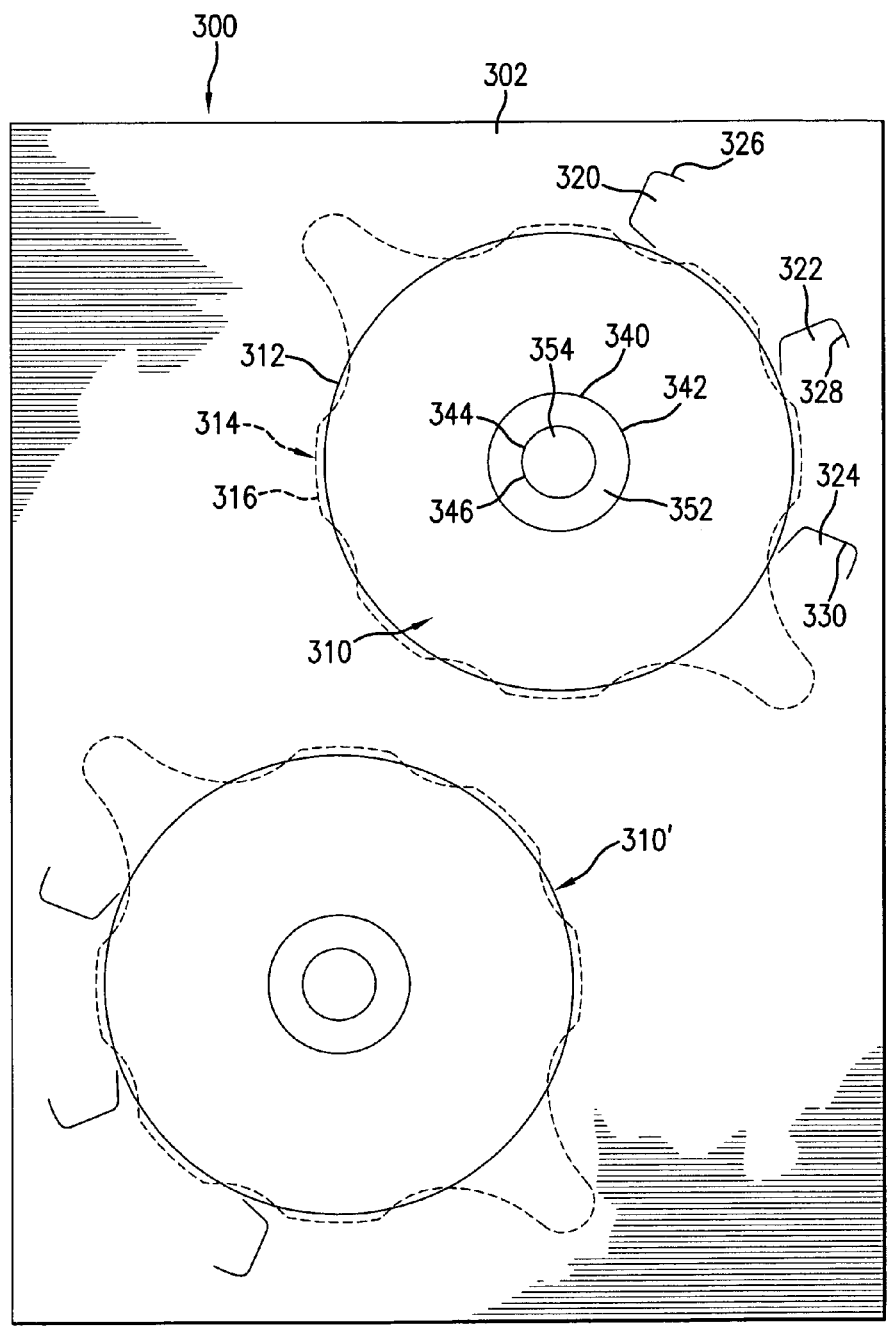
FIG. 11 is a plan view of a label assembly according to yet another embodiment of this invention.
Figure 12:
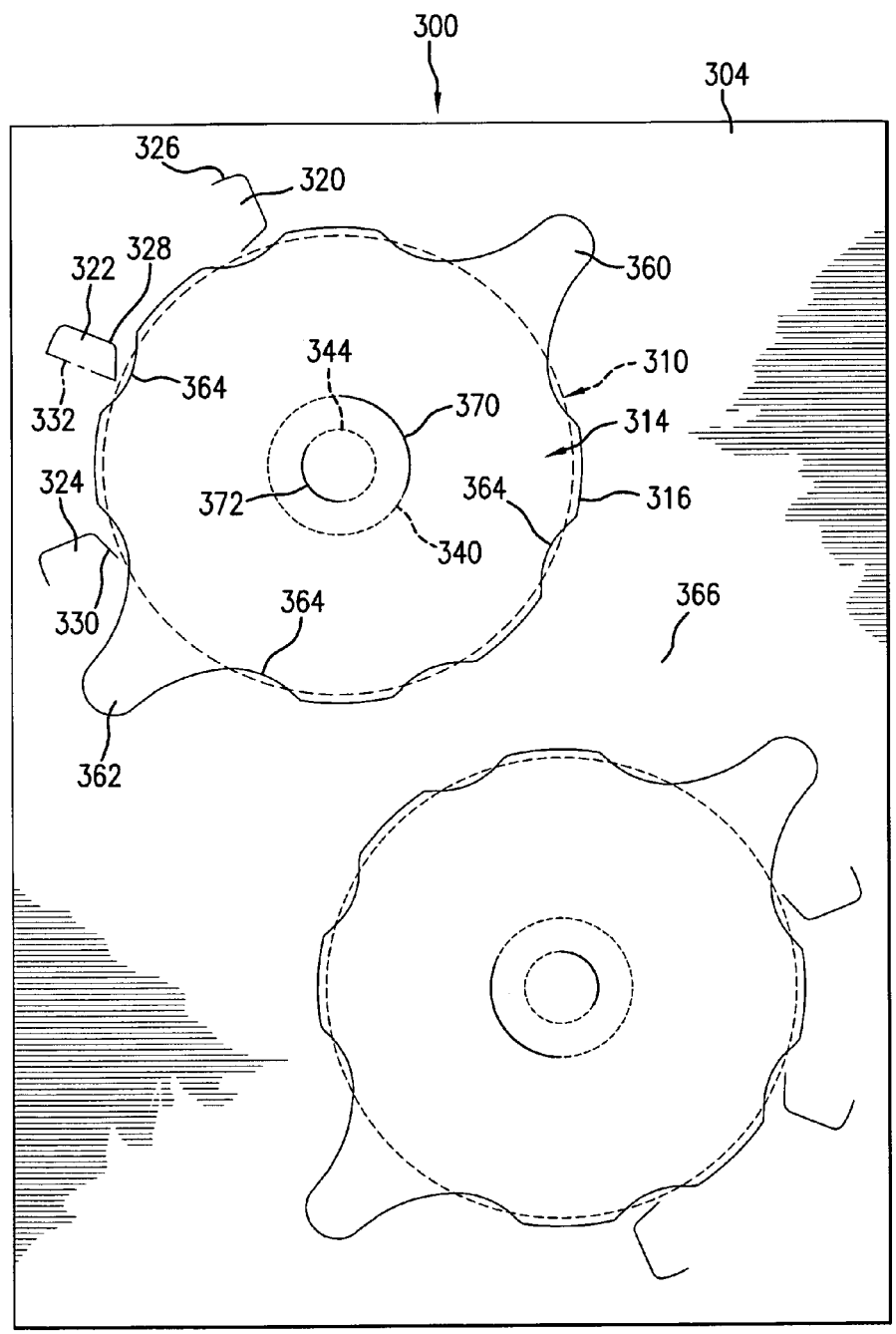
FIG. 12 is a plan view of the back side of the label assembly of FIG. 11.

FIGS. 11 and 12 illustrate a label assembly 300 according to yet another embodiment of this invention. The label assembly 300 includes a front sheet 302 having a printable surface and an adhesive material coating a surface opposite the printable surface. A back sheet 304 is disposed over the adhesive material.

Two label shapes 310 and 310' are defined in the face sheet 302, and will be discussed herein with reference to label shape 310. Circular label shape 310, appropriately sized for use in labeling a CD or DVD, is defined in the face sheet by a tearable line of separation 312. A removable panel 314 is defined in the surface of the back sheet 304 by a tearable line of separation 316, and is disposed over the label shape 310.

The label assembly 300 includes a registration structure aligned with the label shape 310 and the removable panel 314. In the embodiment of FIGS. 11 and 12, the registration structure includes three spaced apart registration tabs 320, 322, and 324, each defined on three sides by a tearable line of separation 326, 328, and 330, respectively, in both the back sheet 304 and the face sheet 302. The registration tabs 320, 322, and 324 are raisable above the back sheet by folding outward, such as about the fold line 332.

A first circle 340 is cut within the face sheet 302 by a tearable line of separation 342 and positioned within the label shape 310. A second circle 344 is also cut within the face sheet 302 by a tearable line of separation 346, and nested within a first perimeter of the first circle 340. A plurality of nested circular removable label shapes 310, 352, and 354 are thus located within the circle formed by tearable line 312. As discussed above, the ring-shaped removable label shape 310 formed between tearable lines 312 and 342 can be adhered to a non-read/write side of the read/write portion of a CD or DVD as a label. Similarly, the ring-shaped removable shape 352 formed between tearable lines 342 and 346 can be adhered to the small non-read/write portion of a CD or DVD as a label. The removable shape 354 is desirably sized to leave an opening that corresponds to the center opening of a CD or DVD.

Various and alternative sizes, shapes, and configurations are available for the removable label shapes of this invention. For example, label shapes 310, 352, and 354 are preferably but not necessarily ring-shaped or circular, as label shapes 310, 352, and 354 can also have any polygonal shape or any other suitable non-circular shape. As another example, an optional further ring-shaped portion (not shown) can be formed between shapes 310 and 352 to serve as a discardable spacer.

The back sheet removable panel 314 includes two removal tabs 360 and 362 extending from a periphery of the removable panel 314. Removal tabs 360 and 362 are desirably positioned on opposing sides of the removable panel 314. As discussed above, removal tabs 360 and 362 are preferably shaped in such a manner so as to facilitate peeling away of removable panel 314. The back sheet 304 also includes a plurality of retainer tabs 364 extending from a back sheet remaining portion 366 and adhering to the label shape 310. The retainer tabs 364 assist in holding the label shape 310 in place, e.g., and attached to the remainder of the front sheet 202, while removing the removable panel 314 to expose the adhesive material on the back side of the label shape 310. In the embodiment shown in FIGS. 11 and 12, each of the spaced apart registration tabs 320, 322, and 324 is aligned with one of the plurality of retainer tabs 364.

According to one preferred embodiment of this invention, when the removable panel 314 is peeled away or otherwise removed from label shape 310, a center hole in label shape 310 is opened by the removal of either only label shape 354 or both label shapes 352 and 354. In the embodiment shown in FIGS. 11 and 12, whether only shape 354 is removed with the removable panel 314 or both shapes 352 and 354 are removed with the removable panel 314 is controlled by which of removal tabs 360 and 362 is used to remove the removable panel 314.

The label assembly 300 includes a first die cut 370 extending in a first arc partially along a perimeter of the first circle 340 and in the face sheet 302 and the back sheet 304. A second die cut 372 extends in a second arc partially along a perimeter of the second circle 344 and in the face sheet 302 and the back sheet 304. Both the first and second arcs extend between approximately 1° and 180°, and more desirably between approximately 5° and 90°, along the first and second circles 340 344, respectively. The first arc die cut 370 is disposed on a side of the first circle 340 toward the first removal tab 360. The second arc die cut 372 is disposed on a side of the second circle 344 toward the second removal tab 362.

Removing the removable panel 314 by grasping removal tab 360 and peeling removable panel 314 from the back sheet 304 (generally in a direction toward the opposing tab 362) results in removal of both label shapes 352 and 354 from the front sheet 302. The die cut 370 desirably causes the label shapes 352 and 354 to continue adhering to the removable panel 314 and to separate (along tearable line 342) from the front sheet 302. Removing the removable panel 314 by grasping the second removal tab 362 and peeling removable panel 314 from the back sheet 304 (generally in a direction toward the opposing tab 360) desirably results in removal of only label shape 354 from the front sheet 302. As there is not die cut like die cut 370 in this direction along the perimeter of circle 340, the shape 352 remains attached to the front sheet 302. The die cut 372 causes the label shape 354, however, to continue adhering to the removable panel 314 and to separate (along tearable line 344) from the front sheet 302. Thus the label assembly user can choose between two alternative shapes of label shape 310, i.e., one version keeping the shape portion 352 attached to cover more surface of the CD or DVD, or a second version without the shape portion 352.

The invention further provides a method for labeling an object using the label assembly, such as label assembly 300. First, the label assembly user routes the label assembly 300 through a printer to print the desired text and/or graphic on the printable surface of label shape 310. The label assembly 330 is desirably placed on a flat hard surface with the printed face sheet 302 downward. The user removes the removable panel 314 using one of the two opposing removal tabs 360 or 362 to expose the adhesive material on the label shape 310. The user raises the registration structure by breaking the tearable lines 326, 328 and 330 and folding the registration tabs 320, 322, and 324 above the surface of the back sheet 304. The user then places the object against the registration tabs 320, 322, and 324 and then lowers the object to adhere the label shape 310 to the object.

Figure 13:
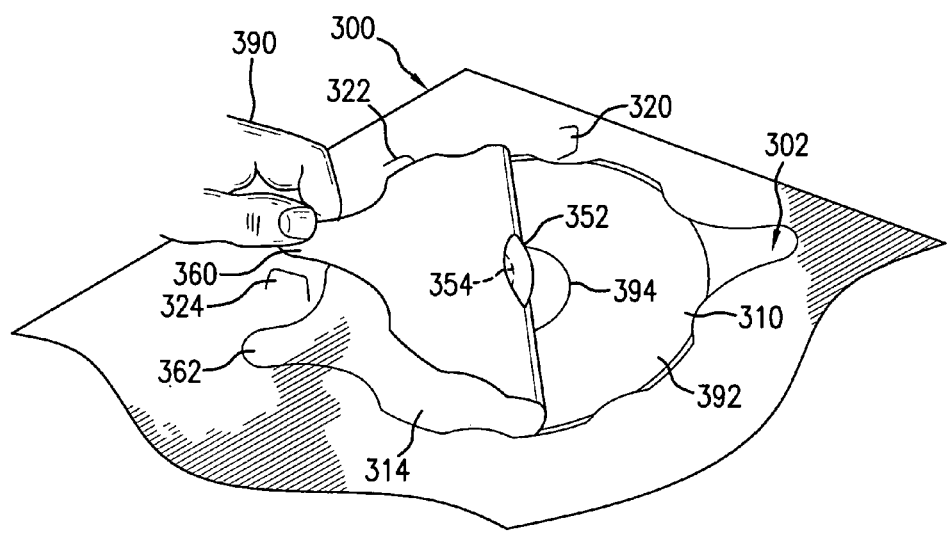
FIGS. 13 and 14 illustrate an operation of the label assembly of FIGS. 11 and 12.
Figure 14:
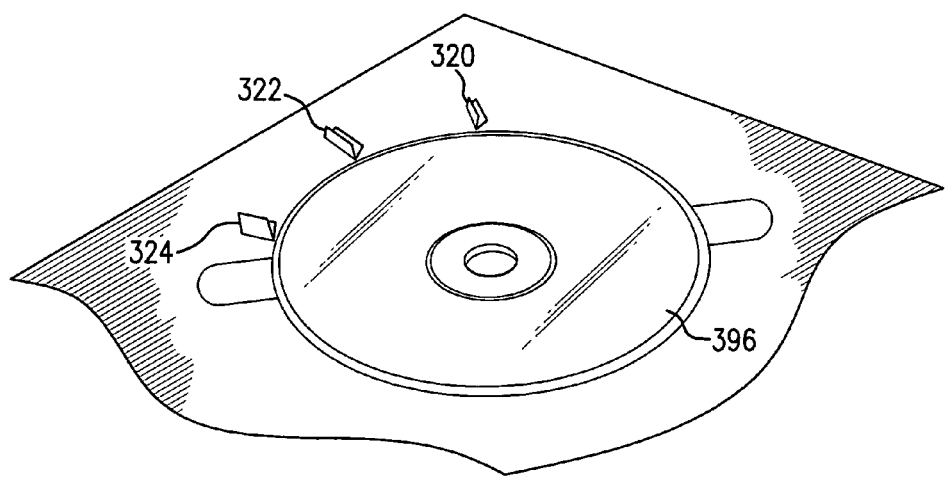

FIGS. 13 and 14 illustrate the use of the label assembly 300. In FIG. 13, the user 390 is peeling the removable panel 314 from the back sheet 304 to expose the adhesive coated side 392 of the label shape 310. The user 390 is peeling by grasping removal tab 360, and thus both label shapes 352 and 354 are removed from the front sheet 302 and stay adhered to the removable panel 314 to provide an opening 394 in label shape 310.

In FIG. 14, the registration tabs 320, 322, and 324 are folded upward, the removable panel 314 is fully removed, and compact disc 396 is placed against the registration tabs 320, 322, and 324 and on the adhesive side of the label shape 310. Placing the compact disc 396 against registration tabs 320, 322, and 324 facilitates proper alignment of the compact disc 396 over the label shape 310, thereby promoting the desired placement of the label shape 310 on the compact disc 396 without a separate label application apparatus. The labeled compact disc 396 can then simply be lifted from the label assembly 300.

Figures 15, 16:
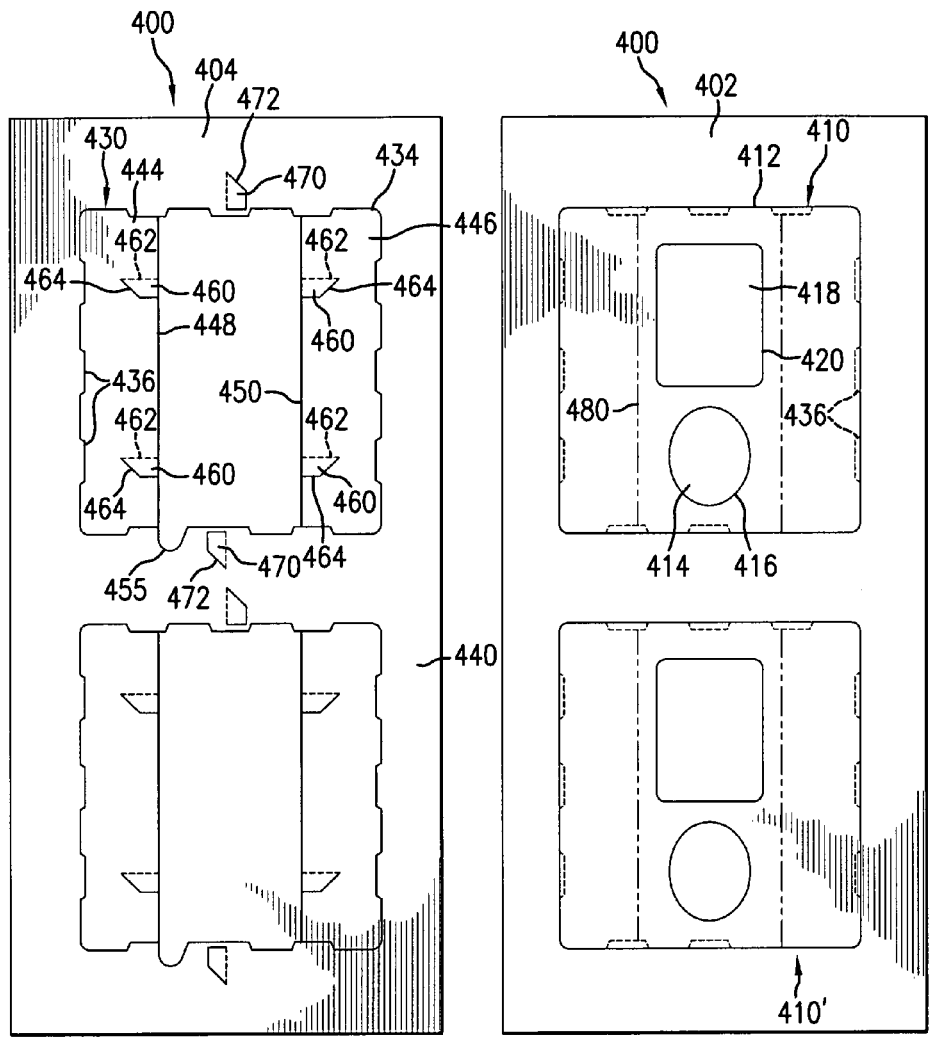
FIGS. 15 and 16 are plan views of a label assembly according to yet another embodiment of this invention.

FIGS. 15 and 16 show the back and front, respectively, of a label assembly 400 according to another embodiment of this invention. Label assembly 400 includes a face sheet 402 having a printed or printable surface, shown in the view of FIG. 16, and an adjacent back sheet 404, shown in the view of FIG. 15. The back sheet 404 is desirably about the same size as the face sheet 402, but may be slightly larger or smaller than the face sheet 402. The surface of the face sheet 402 that is disposed toward the back sheet 404, and opposite the printed or printable surface, includes an adhesive material coating.

The label assembly 400 shown in FIGS. 15 and 16 includes a plurality of label shapes, and more particularly two label shapes 410 and 410'. The two label shapes 410 and 410' can be the same or have different sizes and/or printed patterns, and will be described herein with reference to label shape 410.

The label shape 410 is defined at an outer periphery by a tearable line of separation 412. In the embodiment of the invention shown in FIGS. 15 and 16, the label shape 410 is particularly adapted to be applied to an object having a non-planar and/or more than one surface. The illustrated embodiment is particularly useful in aligning label shape 410 to an object having a planar surface wherein the label is to be applied to a front surface and also wrapped around a side or back surface. In one embodiment of this invention, the label assembly is particularly useful for labeling or personalizing objects having a three-dimensional configuration, including, without limitation, personal electronics such as cell phones, PDAs, digital cameras, netbooks or MP3 players, and also any other objects such as credit cards, RF or SIM chip cards, picture frames, photo or keepsake boxes, jewelry boxes, toy cases, etc.

Figure 20:
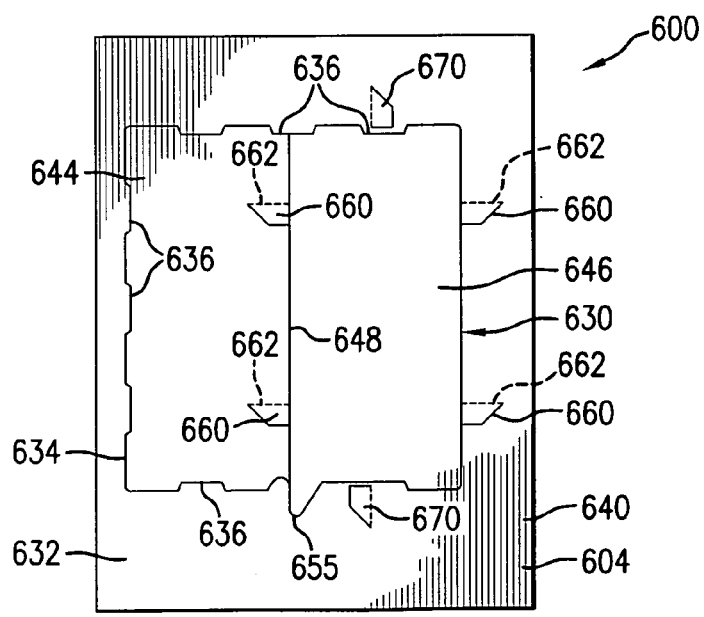

In the embodiment of FIGS. 15 and 16, label shape 410 is configured to be applied to an IPOD® music player, although changes in the size, shape, and configuration of the label shape can be made to accommodate other objects. Label shape 410 includes additional shapes defined within the periphery by additional tearable lines of separation. The label shape 410 includes a circle 414 cut within the face sheet 402 by a second tearable line of separation 416 and a rectangular shape 418 cut within the face sheet 402 by a third tearable line of separation 420. As can be seen in FIG. 15, these lines of separation 416 and 420 are cut only in the face sheet 402 and correspond to the control mechanism and view screen of the music player, such as shown in the embodiment of FIG. 20.

The back sheet 404 includes a removable panel 430 defined in the back sheet surface 432 by at least one tearable line of separation 434 extending around the outer periphery of removable panel 430. The removable panel 430 is disposed over the label shape 410, and as shown in FIGS. 15 and 16, is preferably generally coextensive with label shape 410. The back sheet 404 also includes a plurality of retainer tabs 436 extending from a remaining portion 440 surrounding the removable panel 430 and adhering to the label shape 410. As discussed above, the retainer tabs 436 are particularly useful in holding the label shape 410 in place (and attached to the remaining portion 438 of the front sheet 402) while removing the removable panel 430 to expose the adhesive material on the label shape 410.

In one embodiment of this invention, such as shown in FIGS. 15 and 16, the removable panel 430 is divided into at least two sub-panels, which can assist in applying the label shape 410 to an object, for example, by allowing for only a portion of the removable panel 430 to be removed prior to a first adhesion of the label shape 410 to the object and the subsequent removal or a second panel for wrapping the additional portion of the label shape 410 around a different surface (e.g., a side and/or back surface) of the object. In the embodiment of this invention shown in FIG. 15, the removable panel 430 includes a center panel portion 442 between two side panel portions 444 and 446. The center panel portion 442 is divided from each of the side panel portions 444 and 446 by a corresponding line of separation 448 and 450, respectively, cut within the back sheet 404 only. The center panel portion 442 can also include the optional corner starter flap, or removal tab, 455 that is adapted to allow for easier removal of the center panel portion 442 by the user. The side panel portions can also optionally include such removal tabs.

The label assembly 400 includes a registration structure, embodied in FIGS. 15 and 16 as four spaced apart registration tabs 460 aligned with a portion of the label shape 410. As described above, the registration structure of this embodiment also allows for improved and easier application of a label to an object, for example, an MP3 player. The tabs 460 are each defined on three sides by one or more tearable lines of separation in the back sheet 404. The tabs 460 are raisable to an extended position by folding outward above the back sheet 404. In FIG. 15, fold line 462 shows where the tab 460 will desirably be folded, and can be imaginary or a perforated or otherwise scored fold line.

In the embodiment shown in FIGS. 15 and 16, the registration structure is positioned within an outer periphery of the removable panel 430 and defined in only the back sheet 404. More particularly, at least one, and desirably each, of the two side panel portions 444 and 446 includes one or more of the registration tabs 460. The registration tabs 460 are disposed adjacent to and along an edge of the center panel portion 442. In one embodiment of this invention, the registration tabs 460 are defined on a side adjacent to the center panel portion 442 by the lines of separation 448 and 450, respectively, that are defining the center panel portion 442. The tabs 460 are each defined on the remaining sides by tearable line of separation 464.

Upon removing the center panel portion 442, the object to be labeled can be aligned over the adhesive area that is under the center panel portion 442 using the raised registration tabs 460. The label assembly 400 further includes an optional alignment structure aligned with a portion of the label shape 430 and also one of raised or raisable above the back sheet. In the embodiment shown in FIGS. 15 and 16, the alignment structure includes two alignment tabs 470 each defined by a tearable line of separation 472 and positioned external of the outer periphery of the removable panel 430. The tearable lines of separation 472 can be cut within the back sheet 402 or both the front sheet 402 and the back sheet 404 as they are positioned external of the removable panel 430.

The invention further includes a method for labeling an object with a label from the label assembly 400. As discussed above, label assembly 400 can be pre-printed or printable. If the label assembly is printable, the consumer can print custom images or text on the printable surface of the face sheet 402 with a printer prior to labeling an object. The printed label assembly 400 is placed on a surface with the face sheet 402 downward on the surface. The center panel portion 442 of the removable panel 430 is removed, such as by using starter flap 455, to expose the adhesive material on a first portion of the label shape 410. The registration tabs 460 and the alignment tabs 470 are raised either before or after the center panel portion 442 is removed. A surface of the object (not shown) is placed over the adhesive material and kept in proper alignment using the tabs 460 and 470. A portion of label shape 410 is adhered to the object surface by placing the object on the exposed adhesive material while the object is against the tabs 460 and 470. Once the object surface is adhered, the side panels 444 and 446 can be removed to expose the adhesive material on the remaining label shape 410. The side portions of the label shape 410 are then applied to the object, for example, by folding the side portions of the label shape 410 along fold lines 480 to wrap the side portions around side and/or back surfaces of the object.

In an alternative embodiment, the object is placed on the surface and the label assembly is placed over the object for labeling the object. In such an embodiment, the tabs 460 and 470 can be preferably sized according to a height of the object on the surface, to hold the label shape just over the object. The label shape can then be applied by pressing down on the label shape.

The invention also includes software for printing on the label shape. The software is executable on a data processor attached to a printer and includes templates for allowing the user to apply text or images in the desired location on the label shape (e.g., to avoid the view screen area). The software can include, on a recordable medium, numerous templates each corresponding to one label shape for a known consumer device.

Figure 17:
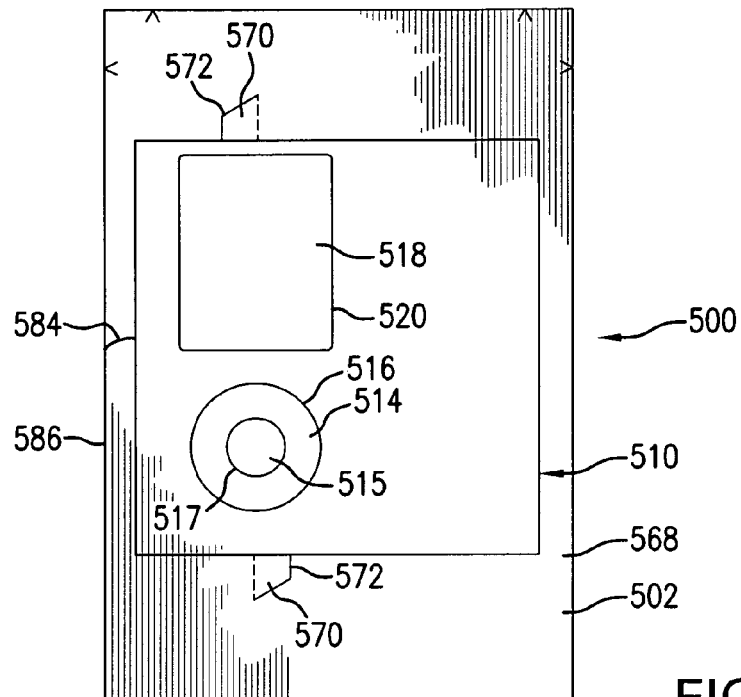
FIGS. 17 and 18 are plan views of a label assembly according to yet another embodiment of this invention.
Figure 18:
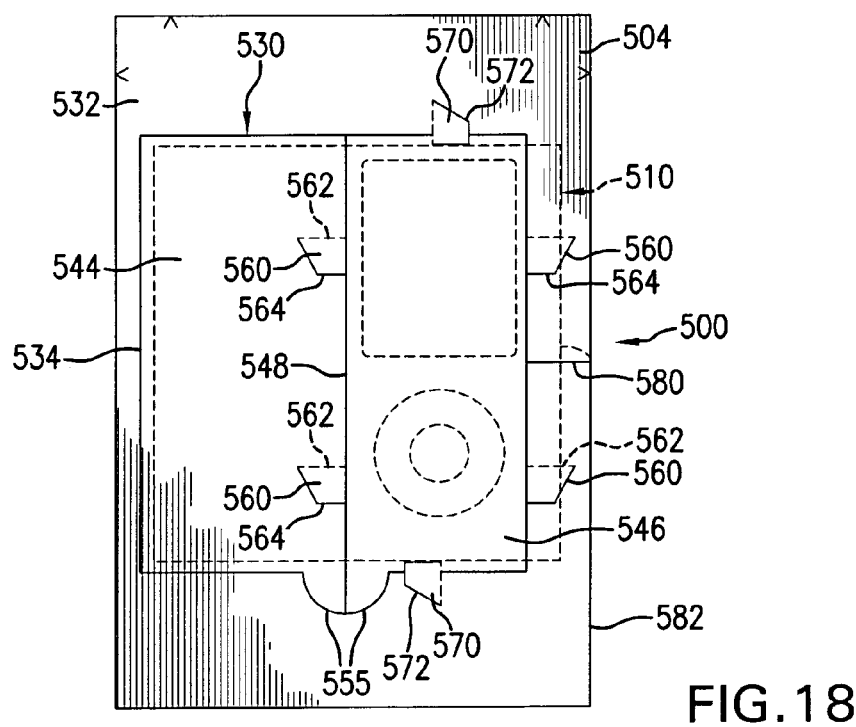

FIGS. 17 and 18 show the front and back, respectively, of a label assembly 500 according to another embodiment of this invention. Label assembly 500 includes a face sheet 502 having a printed or printable surface, shown in the view of FIG. 17, and an adjacent back sheet 504, shown in the view of FIG. 18. The surface of the face sheet 502 that is disposed toward the back sheet 504, and opposite the printed or printable surface, includes an adhesive material coating.

The label assembly 500 shown in FIGS. 17 and 18 includes a single label shape 510, but could alternatively include two or more. The label shape 510 is defined at an outer periphery by a tearable line of separation 512. In the embodiment of the invention shown in FIGS. 17 and 18, the label shape 510 is also particularly adapted to be applied to an object having non-planar or more than one surface. The illustrated embodiment is particularly useful in aligning label shape 510 to an object having a planar surface wherein the label is to be wrapped around a side or back surface. As discussed above for FIGS. 15 and 16, label shape 510 is shown as a label suitable for a current IPOD® music player, but the application means of the embodiment of FIGS. 17 and 18 could be applied using other sizes and shapes of label shapes for other devices, such as consumer electronics or and any other object.

As shown in FIG. 17, the label shape 510 includes additional shapes defined within the periphery by additional tearable lines of separation. The label shape 510 includes two circles 514 and 515 cut within only the face sheet 502 by tearable lines of separation 516 and 517, respectively, which coordinate to the click-wheel and button of the IPOD® player. A rectangular shape 518 is also cut within the face sheet 502 by a tearable line of separation 520 and corresponds to the view screen of the IPOD® player. The tearable lines of the face sheet 502 are shown in phantom in FIG. 18 to illustrate the positioning with the tearable lines and panels of the back sheet 504.

Referring to FIG. 18, the back sheet 504 includes a removable panel 530 defined in the back sheet surface 532 by at least one tearable line of separation 534 extending around the outer periphery of removable panel 530. The removable panel 530 is disposed over a portion, e.g., a majority, of the label shape 510. The removable panel 530 is not exactly coextensive with label shape 510 and extends beyond the label shape 510 on three sides and the label shape 510 extends beyond the removable panel 530 on the fourth side.

The removable panel 530 is divided into two sub-panels, which can assist in applying the label shape 510 to an object, for example, by allowing for only a portion of the removable panel 530 to be removed prior to a first adhesion of the label shape 510 to the object and the subsequent removal or a second panel for wrapping the additional portion of the label shape 510 around a different surface (e.g., a side and/or back surface) of the object. In the embodiment of this invention shown in FIG. 18, the removable panel 530 includes two panel portions 544 and 546. The panel portions 544 and 546 are divided from each other by a line of separation 548, cut within the back sheet 504 only. The panel portions 544 and 546 each include an optional corner starter flap, or removal tab, 555 that is adapted to allow for easier removal of the panel portions 544 and 546 by the user.

The label assembly 500 includes a registration structure, embodied in FIG. 18 as four spaced apart registration tabs 560 aligned with a portion of the label shape 510. The tabs 560 are each defined on three sides by one or more tearable lines of separation in the back sheet 504. The tabs 560 are raisable to an extended position by folding outward above the back sheet 504. In FIG. 18, fold lines 562 show where the tab 560 will desirably be folded, and can be imaginary or a perforated or otherwise scored fold line.

In the embodiment shown in FIG. 18, a portion of the registration structure is positioned within an outer periphery of the removable panel 530 and defined in only the back sheet 504. More particularly, the side panel portion 544 includes two of the registration tabs 560. The registration tabs 560 of side panel portion 544 are disposed adjacent to and along an edge of the other panel portion 546. In this embodiment of this invention, the additional two registration tabs 560 are positioned external of the outer periphery of the removable panel 530 and on an opposite side of the side panel portion 546 from side panel portion 544. However, in this embodiment all tabs 560 are cut only in the back sheet 504, as the label sheet 510 extends over at least a portion of each of the tabs 560. Each of the registration tabs 560 is defined on a side adjacent to the panel portion 546 by the line of separation 548 and 534, respectively. The tabs 560 are defined on the remaining sides by tearable line of separation 564.

Upon removing the panel portion 546, the object to be labeled can be aligned over the adhesive area that is under the panel portion 546 using the raised registration tabs 560. The label assembly 500 further includes an optional alignment structure aligned with a portion of the label shape 530 and also one of raised or raisable above the back sheet. The alignment structure includes two alignment tabs 570 defined by a tearable line of separation 572 and positioned external of the outer periphery of the removable panel 530. The tearable line of separation 572 can be cut within the back sheet 504 or both the front sheet 502 and the back sheet 504 as shown in FIGS. 17 and 18, as they are positioned external of the removable panel 530 and label shape 510.

In one embodiment of this invention, the label assembly 500 includes a removal facilitation structure for aiding the user in removing the matrix 568 from the label sheet 510 upon adhering an object to the panel portion 546. As shown in FIGS. 17 and 18, the removal facilitation structure includes a die cut 580 in the back sheet 504 extending between the removable panel 530 and an outer edge 582 of the back sheet 504. The die cut 580 is used in cooperation with a die cut 584 in the front sheet 502 that extends from the label shape 510 to an edge 586 of the front sheet 502. Preferably, the die cut 580 and the die cut 584 are at least partially offset from each other to help maintain the matrix 568 connection until torn by the user. In the embodiment shown in FIGS. 17 and 18, the die cut 584 is curved and intersects with the die cut 580 at the edge 586 of the face sheet 502.

The label assembly 500 is used in a similar manner as the label assembly 400 discussed above. If the label assembly 500 is to be printed upon, the user feeds the label assembly 500 through a suitable printer. To facilitate printing the tabs 560 have the fold lines 562 disposed toward the printing feed direction to reduce the chance of the tabs 560 being raised during printing.

Either the object to be labeled or the label assembly 500 is placed on a surface. The panel portion 546 is removed and the tabs 560 and 570 are raised. When the label assembly is placed face sheet down on the surface, the object is placed over the exposed adhesive material and kept in proper alignment using the tabs 460 and 470. Alternatively, the label assembly 500 with the removed panel portion 546 can be placed from above onto an object placed on a surface. The tabs 460 and 470 align the label shape 510 over the object as the label assembly 500 is lowered onto the object. The tabs 560 and 570 can act as legs to stand the label assembly over the object until the user pats the exposed adhesive against the object to adhere the label shape 510 to the object. Desirably, the tabs are appropriately sized to a thickness of the object.

Once the label shape 510 is partially adhered to the object, the other panel portion 544 is removed, and the matrix is removed from the label shape 510. The removal of the matrix is facilitated by the user separating die cuts 580 and 584 and tearing the matrix from around label shape 510. The label shape can then be wrapped around the object. Where the object has rounded sides, such as an IPOD®, the object can be rolled on the label shape 510 on the flat surface to adhere the additional portions of the label shape to the object. Desirably the edges of the wrapped label sheet meet end to end, but overlap or a gap are also possible.

Figure 19:
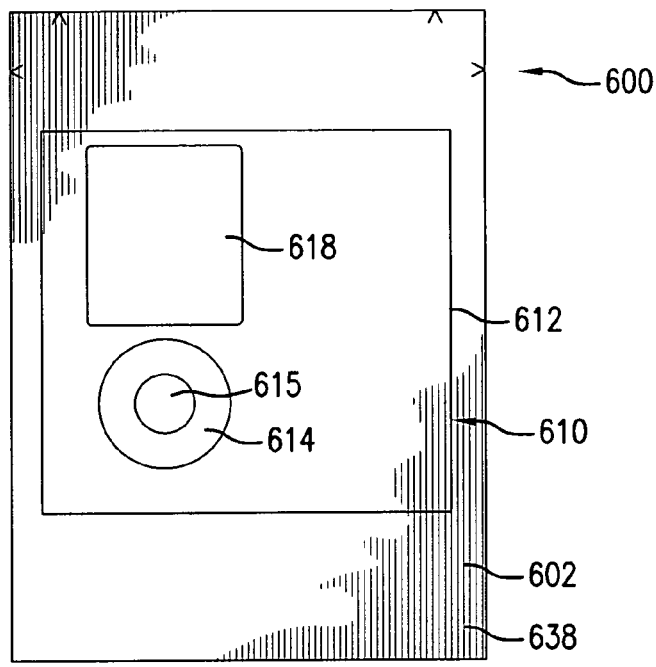
FIGS. 19 and 20 are plan views of a label assembly according to still yet another embodiment of this invention.

FIGS. 19 and 20 show the front and back, respectively, of a label assembly 600 according to another embodiment of this invention. Label assembly 600 is a variation of the label assembly 500 shown in FIGS. 17 and 18. Label assembly 600 includes a face sheet 602 having a printed or printable surface, shown in the view of FIG. 19, and an adjacent back sheet 604, shown in the view of FIG. 20. An adhesive material is disposed between the face sheet 602 and the back sheet 604.

The label assembly 600 shown in FIGS. 19 and 20 includes a single label shape 610, but could alternatively include two or more. The label shape 610 is defined at an outer periphery by a tearable line of separation 612. In the embodiment of the invention shown in FIGS. 19 and 20, the label shape 610 is also particularly adapted to be applied to an object having non-planar or more than one surface. Label shape 610 is also shown as a label suitable for a current IPOD® music player, including two circles 614 and 615 cut within only the face sheet 602 which coordinate to the click-wheel and button of the IPOD® player, respectively, and rectangular shape 618 cut within the face sheet 602 to correspond to the view screen of the IPOD® player. The application means of the embodiment of FIGS. 19 and 20 could be applied using other sizes and shapes of label shapes for other devices, such as consumer electronics or and any other object.

In one embodiment of this invention, an arcuate die cut can be used as discussed above to facilitate removal of the circles 614 and/or 615 from label shape 610 if desired. If the center circle 615 is desired, but not the outer circle 614, an adhesive strip (such as a paper strip with a tacky but not permanent adhesive) or equivalent can be placed across the face sheet 602 and over the circles 614 and 615. When the removable panel 630 is removed, the outer circle 614 can be removed while the inner circle is held in place by the adhesive strip.

Referring to FIG. 20, the back sheet 604 includes a removable panel 630 defined in the back sheet surface 632 by at least one tearable line of separation 634 extending around the outer periphery of removable panel 630. In this embodiment of the invention, the removable panel 630 is generally coextensive with label shape 610 on three sides which include plurality of retainer tabs 636 extending on three sides from a remaining portion 640 surrounding the removable panel 630 and adhering to the label shape 610. As discussed above, the retainer tabs 636 are particularly useful in holding the label shape 610 in place (and attached to the remaining portion 638 of the front sheet 602) while removing the removable panel 630 to expose the adhesive material on the label shape 610. On the fourth side of label shape 610, the tearable line defining the periphery of the removable panel 630 is optionally offset from the tearable line defining the periphery of the label shape 610 to allow a portion of label shape 610 to be wrapped around one side of the object to be labeled.

The removable panel 630 is divided into two sub-panels, which can assist in applying the label shape 610 to an object, for example, by allowing for only a portion of the removable panel 630 to be removed prior to a first adhesion of the label shape 610 to the object and the subsequent removal or a second panel for wrapping the additional portion of the label shape 610 around a different surface (e.g., a side and/or back surface) of the object. In the embodiment of this invention shown in FIG. 20, the removable panel 630 includes two panel portions 644 and 646. The panel portions 644 and 646 are divided from each other by a line of separation 648, cut within the back sheet 604 only. One or both of the panel portions 644 and 646 can include an optional corner starter flap, or removal tab, 655 that is adapted to allow for easier removal of the panel portions 644 and/or 646 by the user.

The registration structure of the label assembly 600 includes four spaced apart registration tabs 660 aligned with a portion of the label shape 610. In this embodiment of the invention, the tabs 660 are each defined on three sides by one or more tearable lines of separation in only the back sheet 604. The tabs 660 are raisable to an extended position by folding outward above the back sheet 604 at perforated or otherwise scored fold lines 662.

Similar to the embodiment discussed above in FIGS. 17 and 18, a portion of the registration structure is positioned within an outer periphery of the removable panel 630 and defined in only the back sheet 604. More particularly, the side panel portion 644 includes two of the registration tabs 660. The registration tabs 660 of side panel portion 644 are disposed adjacent to and along an edge of the other panel portion 646. In this embodiment of this invention, the additional two registration tabs 660 are positioned external of the outer periphery of the removable panel 630 and on an opposite side of the side panel portion 646 from side panel portion 644. However, in this embodiment all tabs 660 are cut only in the back sheet 604, as the label sheet 610 extends over at least a portion of each of the tabs 660.

Upon removing the panel portion 646, the object to be labeled can be aligned over the adhesive area that is under the panel portion 646 using the raised registration tabs 660. The label assembly 600 further includes optional opposing alignment tabs 670 defined by a tearable line of separation 672 and positioned external of the outer periphery of the removable panel 630. In this embodiment, the tearable lines of separation 672 are cut only within the back sheet 602 because of the placement of the tabs 670 within corresponding retainer tabs 636. Alternative configurations could allow for the tabs 670 to be cut within both of the front sheet 602 and back sheet 604 for extra rigidity. The label assembly 600 is used in a similar manner as the label assembly 500 discussed above.

Figure 22:
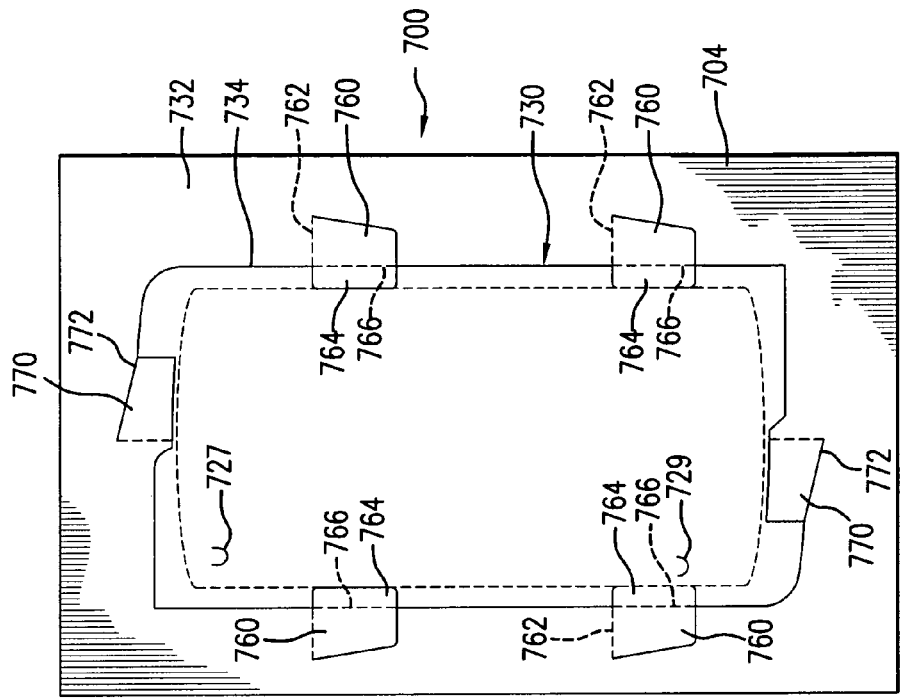
FIGS. 21 and 22 are plan views of a label assembly according to yet another embodiment of this invention.
Figure 21:
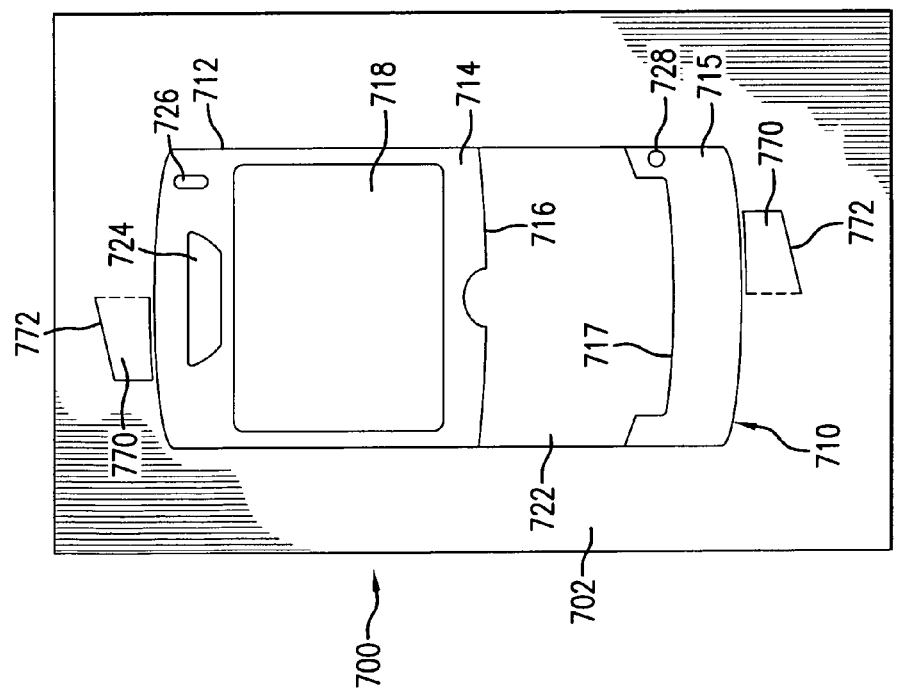

FIGS. 21 and 22 show the front and back, respectively, of a label assembly 700 according to another embodiment of this invention. Label assembly 700 includes a face sheet 702 having a printed or printable surface, shown in the view of FIG. 21, and an adjacent back sheet 704, shown in the view of FIG. 22. The surface of the face sheet 702 that is disposed toward the back sheet 704, and opposite the printed or printable surface, includes an adhesive material coating.

The label assembly 700 shown in FIGS. 21 and 22 includes a label shape 710. The label shape 710 is defined at an outer periphery by a tearable line of separation 712. In the embodiment of the invention shown in FIGS. 21 and 22, the label shape 710 is also particularly adapted to be applied to an object having a side with more than one area or surface for receiving a label. The illustrated embodiment is particularly useful in aligning label shape 710 to a cell phone or smart phone, such as a BLACKBERRY® smart phone or IPHONE™, but the application means of the embodiment of FIGS. 21 and 22 could be applied using other sizes and shapes of label shapes for other devices, such as consumer electronics or and any other object.

As shown in FIG. 21, the label shape 710 includes additional shapes defined within the periphery 712 by additional tearable lines of separation. Label shape 710 includes two shapes 714 and 715 cut within only the face sheet 702 by tearable lines of separation 716 and 717, respectively, which define the labels to be applied to surfaces of the object to be labeled. A rectangular shape 718 is also cut within the face sheet 702 by a tearable line of separation 720 and corresponds to the view screen of the smart phone. Other shapes defined by tearable lines include shape 722 which corresponds to the keyboard, shape 724 which corresponds to a decorative feature, and shapes 726 and 728 which correspond to functional features such as, for example, microphone and/or speaker openings of the smart phone. As shown in FIG. 22, the back sheet 704 can include arcuate or otherwise corresponding die cuts 727 and 729, respectively, along a portion of the shapes 726 and 728, as described above, to assist in maintaining the connection of shapes 726 and 728 to the removable panel 730.

Removable panel 730 defined in the back sheet surface 732 by at least one tearable line of separation 734 extending around the outer periphery of removable panel 730. The removable panel 730 is disposed over label shape 710. In this embodiment of the invention, the removable panel 730 is not exactly coextensive with label shape 710 and extends beyond the label shape 710 on all four sides. In this embodiment, as only one side of the object is to be labeled, the removable panel 730 comprises a single panel to be removed prior to a first adhesion of the label shape 710 to the object.

The label assembly 700 includes a registration structure, embodied in FIG. 22 as four spaced apart registration tabs 760 aligned with a portion of the label shape 710. The tabs 760 are each defined on three sides by one or more tearable lines of separation in the back sheet 704. The tabs 760 are raisable to an extended position by folding outward above the back sheet 704. In FIG. 22, fold lines 762 show where the tab 760 will desirably be folded, and can be imaginary or a perforated or otherwise scored fold line.

In the embodiment shown in FIG. 22, each of the registration tabs 760 includes a foldable portion 764 foldable about a tab fold line 766, which can be imaginary or a perforated or otherwise scored fold line. The registration tabs 760 in the embodiment of FIG. 22 are disposed external of the periphery of the label shape 710 (shown in phantom in FIG. 22) and the removable panel 730. In this embodiment of the invention, the tabs 760 are cut only in the back sheet 704, but could optionally be cut within the face sheet 702 as well.

Upon removing the removable panel 730, the object to be labeled can be aligned over the adhesive area that is under the panel 730 using the raised registration tabs 760. The label assembly 700 further includes an optional alignment structure aligned with a portion of the label shape 730 and also one of raised or raisable above the back sheet. The alignment structure includes two alignment tabs 770 defined by a tearable line of separation 772 and also positioned external of the outer periphery of the removable panel 730 and label shape 710. The tearable line of separation 772 can be cut within the back sheet 702 or both the front sheet 702 and the back sheet 704 as shown in FIGS. 21 and 22.

The label assembly is used in a manner similar to described above. If the label assembly 700 is to be printed upon, the user feeds the label assembly 700 through a suitable printer. Either the object to be labeled or the label assembly 700 is placed on a surface. The tabs 760 and 770 are raised above the back sheet 704 and the removable panel 730 is removed. In one embodiment of this invention, the object to be labeled is placed on a flat surface, such as a table. Each of the foldable portions 764 are folded about fold line 766 in a direction away from fold line 762 so that the foldable portion is at an angle to the remaining portion of the corresponding tab 760 and extending over an exposed portion of the face sheet 702.

Figure 23:
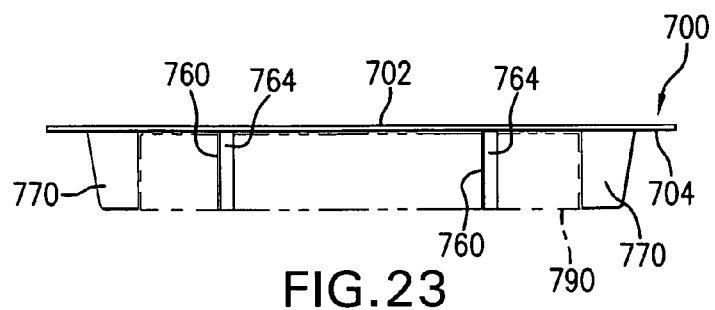
FIG. 23 illustrates the use of the label assembly of FIGS. 21 and 22.

As shown in FIG. 23, the label assembly 700 with the removed panel 730 is placed onto the object 790 (shown in phantom) from above. The tabs 760 and 770 align the label shape 710 over the object as the label assembly 700 is lowered onto the object 730. The tabs 760 and 770 can act as legs to stand the label assembly over the object until the user pats the exposed adhesive against the object to adhere the label shape 710 to the object. Desirably, the tabs are appropriately sized, e.g., slightly taller, to a thickness of the object.

Figure 24:
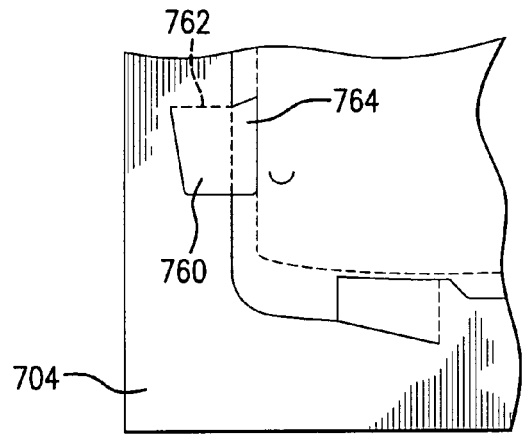
FIGS. 24 and 25 are alternative configurations of registration tabs according to one embodiment of this invention.
Figure 25:
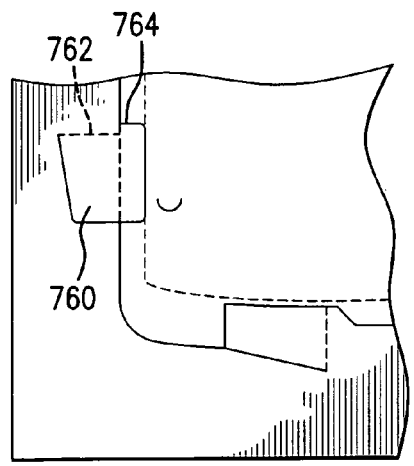

The foldable portions 764 provide additional strength for the tabs 760 when functioning as "legs" in use as shown in FIG. 23. The foldable portions 764 contact the underside of the remaining matrix 768 of the face sheet 702 to help keep the tabs 760 from collapsing and maintaining the label shape 710 at the desired location above the object 790 until final application. As will be appreciated various sizes, shapes and configurations are available for the registration tabs and foldable portions thereof of this invention. In one embodiment of this invention, the edge of the foldable portion 764 that contacts the bottom of the face sheet 702 is angled as shown in FIG. 24 to facilitate contact with the face sheet 702 while maintaining a desired substantially perpendicular position of tab 760 when extended. An alternative edge configuration is shown in FIG. 25, where the edge 764 is cut higher than fold line 762 by a thickness of the back sheet 704.

Once the label shape 710 is partially adhered to the object the matrix is removed from the label shape 710. The removal of the matrix is facilitated by the user separating die cut 712 and tearing the matrix from around label shape 710.

Figure 26:
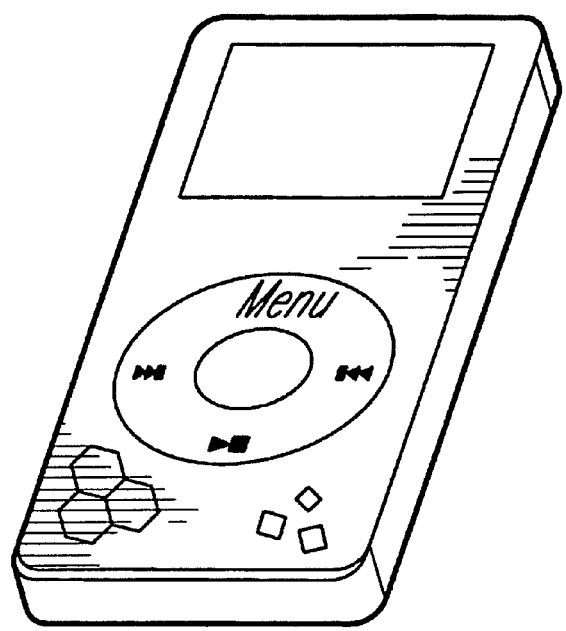
FIG. 26 shows an object labeled according to one embodiment of this invention.

FIG. 26 shows an object, namely an IPOD® music player labeled according to one embodiment of this invention.

Figure 27:
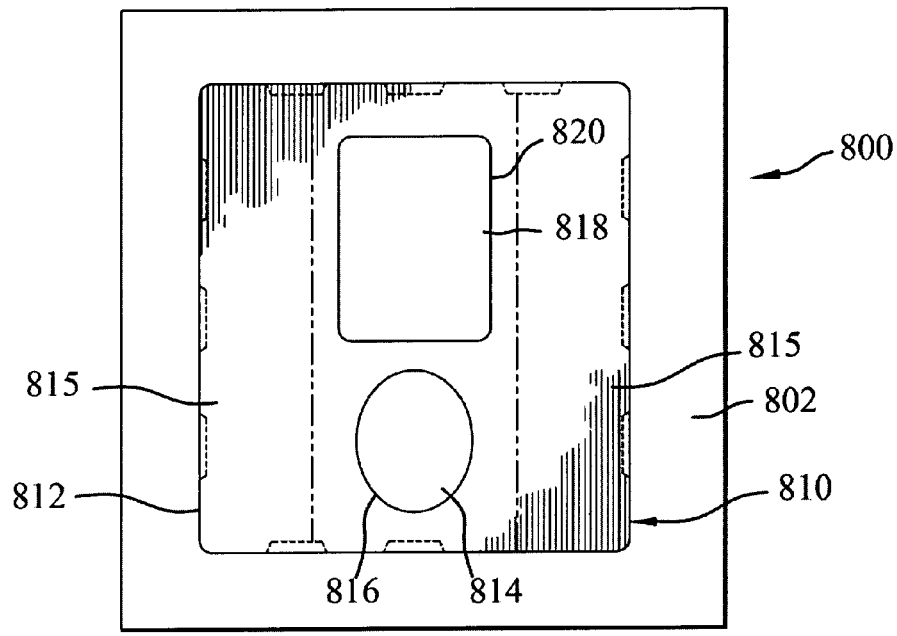
FIGS. 27 and 28 show the front and back, respectively, of a label assembly 800 according to another embodiment of this invention.
Figure 28:
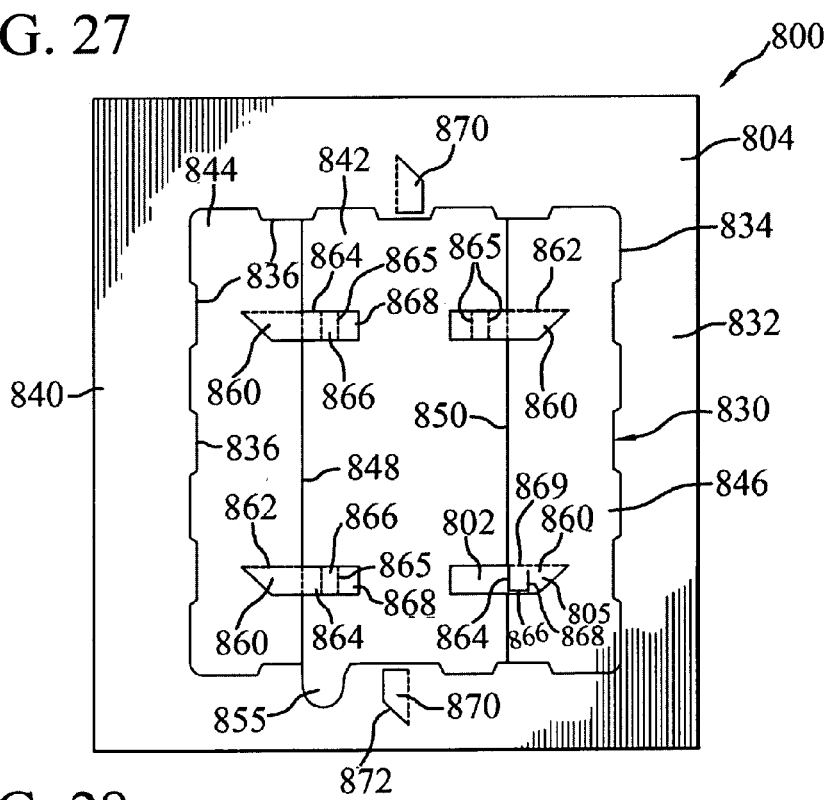

FIGS. 27 and 28 show the front and back, respectively, of a label assembly 800 according to another embodiment of this invention. Label assembly 800 includes a face sheet 802 having a printed or printable surface, shown in the view of FIG. 27, and an adjacent back sheet 804, shown in the view of FIG. 28. The back sheet 804 is desirably about the same size as the face sheet 802, but may be slightly larger or smaller than the face sheet 802. The surface of the face sheet 802 that is disposed toward the back sheet 804, and opposite the printed or printable surface, includes an adhesive material coating 805.

The label assembly 800 shown in FIGS. 27 and 28 includes a single label shape 810, but as with the other embodiments of this invention can include more than one label shape per label assembly. The label shape 810 is defined at an outer periphery by a tearable line of separation 812. In the embodiment of the invention shown in FIGS. 27 and 28, the side portions 815 of label shape 810 is particularly adapted to be applied to, and in this case wrapped around, an object having a non-planar and/or more than one surface. The illustrated embodiment is particularly useful in aligning label shape 810 to an object having a planar surface wherein the label is to be applied to a front surface and also wrapped around a side or back surface.

In the embodiment of FIGS. 27 and 28, label shape 810 is configured to be applied to a handheld music player, although changes in the size, shape and configuration of the label shape can be made to accommodate other objects, such as discussed previously. Label shape 810 includes additional shapes defined within the periphery by additional tearable lines of separation. The label shape 810 includes a circle 814 cut within the face sheet 802 by a second tearable line of separation 816 and a rectangular shape 818 cut within the face sheet 802 by a third tearable line of separation 820. As can be seen in FIG. 27, these lines of separation 816 and 820 are cut only in the face sheet 802 and correspond to the control mechanism and view screen of the music player.

The back sheet 804 includes a removable panel 830 defined in the back sheet surface 832 by at least one tearable line of separation 834 extending around the outer periphery of removable panel 830. The removable panel 830 is disposed over the label shape 810, and as shown in FIGS. 26 and 27, is preferably generally coextensive with label shape 810. The back sheet 804 also includes a plurality of retainer tabs 836 extending from a remaining portion 840 surrounding the removable panel 830 and adhering to the label shape 810. As discussed above, the optional retainer tabs 836 are particularly useful in holding the label shape 810 in place (and attached to the remaining portion 838 of the front sheet 802) while removing the removable panel 830 to expose the adhesive material on the label shape 810.

In one embodiment of this invention, the removable panel 830 is divided into at least two sub-panels, which can assist in applying the label shape 810 to an object, for example, by allowing for only a portion of the removable panel 830 to be removed prior to a first adhesion of the label shape 810 to the object and the subsequent removal or a second panel for wrapping the additional portion of the label shape 810 around a different surface (e.g., a side and/or back surface) of the object. In the embodiment of this invention shown in FIG. 28, the removable panel 830 includes a center panel portion 842 between two side panel portions 844 and 846. The center panel portion 842 is divided from each of the side panel portions 844 and 846 by a corresponding line of separation 848 and 850, respectively, cut within the back sheet 804 only. The center panel portion 842 can also include the optional corner starter flap, or removal tab, 855 that is adapted to allow for easier removal of the center panel portion 842 by the user. The side panel portions can also optionally include such removal tabs.

The label assembly 800 includes a registration structure, embodied in FIG. 28 as four spaced apart registration tabs 860 aligned with a portion of the label shape 810. As described above, the registration structure of this embodiment also allows for improved and easier application of a label to an object, for example, an MP3 player or smart phone. The tabs 860 are each defined by one or more tearable lines of separation in the back sheet 804. The tabs 860 are raisable to an extended position by folding outward above the back sheet 804, which exposes a portion of the adhesive material on the back of face sheet 802. In FIG. 27, fold lines 862 show where the tabs 860 will desirably be folded when raised, and can be imaginary or a perforated or otherwise scored fold lines.

In the embodiment shown in FIGS. 27 and 28, the registration structure is positioned within an outer periphery of the removable panel 830 and defined in only the back sheet 804. More particularly, at least one, and desirably each, of the two side panel portions 844 and 846 includes a portion of one or more of the registration tabs 860. The registration tabs 860 are disposed along an edge of the center panel portion 842, and when raised and folded are aligned with the edge of the center panel portion 842 or the exposed adhesive there beneath.

Each of the registration tabs includes more than one foldable panels. As shown in FIG. 28, there are three foldable panels 864, 866, and 868, each defined on at least one side by a fold line 865. When raised during use, each of the registration tabs 860 is folded along each of the fold lines 865 to form a three-dimensional box-like registration structure 869. The box shape of the registration tabs 860 has the general form of a polyhedron, and more specifically a polyhedral tube in that two opposing end faces are open. In the raised position, foldable panel 864 faces the center panel 842 and the exposed adhesive when the center panel 842 is removed. Foldable panels 866 and 868 fold around to be over and on the adhesive exposed by raising registration tab 860 so that the exposed adhesive assists the holding of the formed box-like structure 869 in the folded form.

Upon removing the center panel portion 842, the object to be labeled can be aligned over the adhesive area that is under the center panel portion 842 using the raised registration tabs 860. The label assembly 800 further includes an optional alignment structure aligned with a portion of the label shape 830 and also one of raised or raisable above the back sheet. In the embodiment shown in FIG. 28, the alignment structure includes two alignment tabs 870 each defined by a tearable line of separation 872 and positioned external of the outer periphery of the removable panel 830. The alignment tabs 870 can also be formed using the same or similar structure to the registration tabs 860 or according to other embodiments discussed herein.

Various sizes, shapes, and configurations are available for the registration structure and the foldable panels of the registration structure of this invention. For example, the registration structure desirably includes more than one foldable panel, but can have two, three, four, or more foldable panels, thereby providing different configuration and polyhedral shapes (e.g., triangular, square prism, etc.), depending at least in part on the configuration of the label and the object to be labeled.

Figure 29:
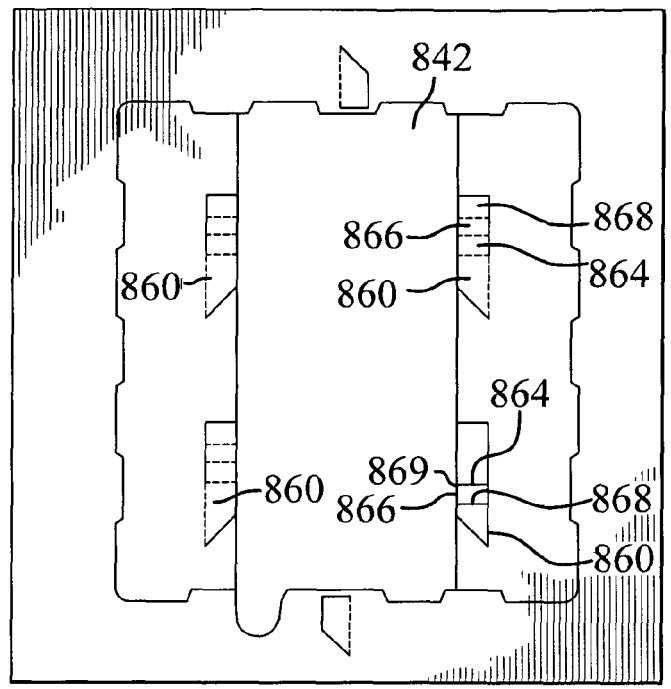
FIGS. 29-32 are alternative configurations of registration tabs according to other embodiments of this invention.

FIGS. 29-33 illustrate, without limitation, several possible registration structure alternatives. In FIG. 29, the registration structure is similar to the registration structure shown in FIG. 28, only arranged in a different direction. Instead of extending into the center panel portion 842, the longitudinal sides of the registration tabs 860 extend parallel alongside the center panel portion 842. In the embodiment of FIG. 29, the folded panel 866 of the box-like structure 869 faces the center panel portion 842 and the exposed adhesive. The open end faces of the polyhedral tube extend parallel to the label assembly, and are still held in the box shape by the exposed adhesive material.

Figure 30:
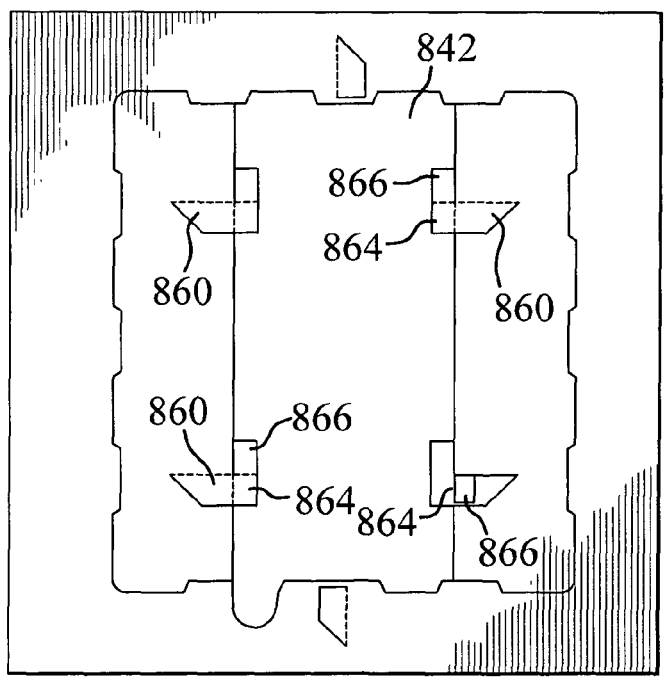

FIG. 30 illustrates a registration structure with only two foldable panels, and forming an L-shaped registration tab 860. The registration tab 860 includes two perpendicular fold lines 865. When folded, the foldable panel 864 is disposed toward and aligned with the center panel portion 842. The foldable panel 866 is disposed parallel to and against the exposed face sheet 802, and temporarily held in place by the exposed adhesive, in addition to the folding of the fold lines into the folded structure.

Figure 31:
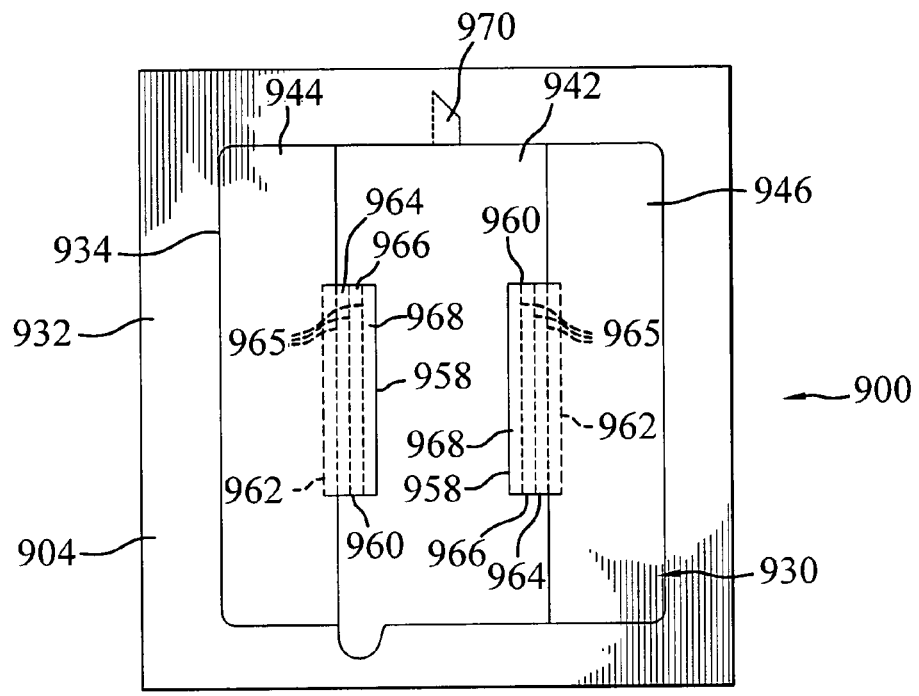
Figure 32:
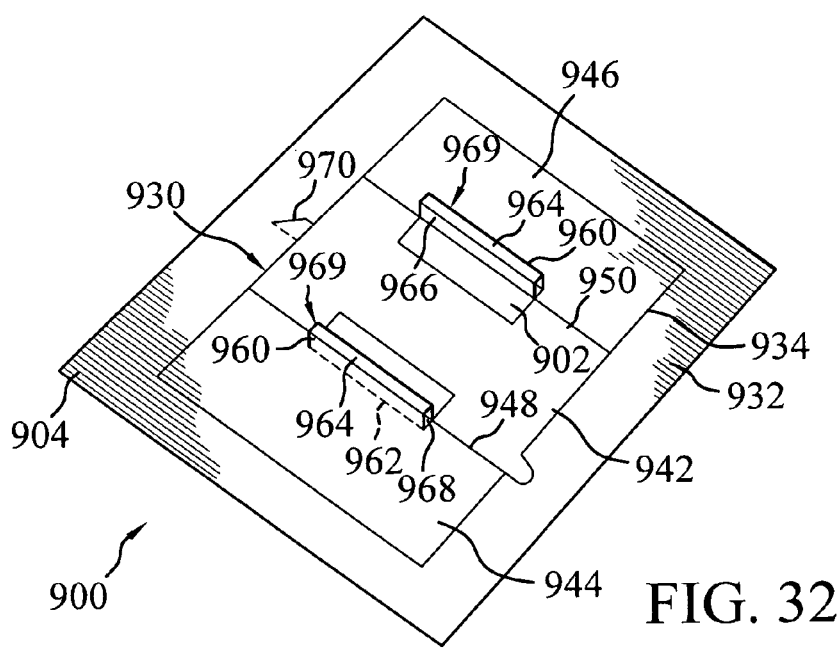

FIGS. 31 and 32 illustrate a label assembly 900 according to another embodiment of this invention. Label assembly 900 includes a back sheet 904 and a face sheet 902 with a layer of adhesive disposed there between.

The back sheet 904 includes a removable panel 930 defined in the back sheet surface 932 by at least one tearable line of separation 934 extending around the outer periphery of removable panel 930. Similar to the previously illustrated embodiments, the removable panel 930 includes a center panel portion 942 between two side panel portions 944 and 946. The center panel portion 942 is divided from each of the side panel portions 944 and 946 by a corresponding line of separation 948 or 950, respectively, cut within the back sheet 904 only.

The label assembly 900 includes a registration structure embodied as two spaced apart registration tabs 960 aligned with a portion of the removable panel 930 and a portion of the label shape there beneath. In this embodiment the tabs 960 are each defined on three sides by one or more tearable lines of separation 958 in the back sheet 904. The tabs 960 have a rectangular shape in FIGS. 31 and 32 but are not limited to any particular shape or configuration, and could be other shapes such as squares, ellipses, or rounded or semicircular shapes. The tabs 960 are raisable to an extended position by folding outward above the back sheet 904 at fold lines 962 which can be imaginary or a perforated or otherwise scored fold line. The fold lines 962 connect the tabs 960 to the side panels 944 and 946, respectively, while the tabs 960 are separate from the center panel 942 by the lines of separation 958 to allow the removal of the center panel 942.

Each of the registration tabs 960 includes more than one foldable panel, and more particularly three foldable panels 964, 966, and 968, each defined on at least one side by a fold line 965. When raised during use, each of the registration tabs 960 is folded along each of the fold lines 965 to form a three-dimensional, box-shaped registration structure 969, as shown in FIG. 32 having a polyhedral tube configuration with opposing open ends. In the raised position, foldable panel 966 faces the center panel 942, and ultimately faces exposed adhesive when the center panel 942 is removed, and has an edge in an "in-line" alignment with the tearable line of separation 948 or 950. The foldable panel 968 folds around to be disposed over and temporarily adhered to the adhesive exposed by raising registration tab 960 so that the adhesive assists the holding of the formed box-like structure 969 in the folded position. The structures 969, in combination with the optional alignment tab 970, which can alternatively be formed similar to the box-like tabs 969, provide registration or guide members to place the object to be labeled in an aligned position over the exposed adhesive as discussed above.

Figure 33:
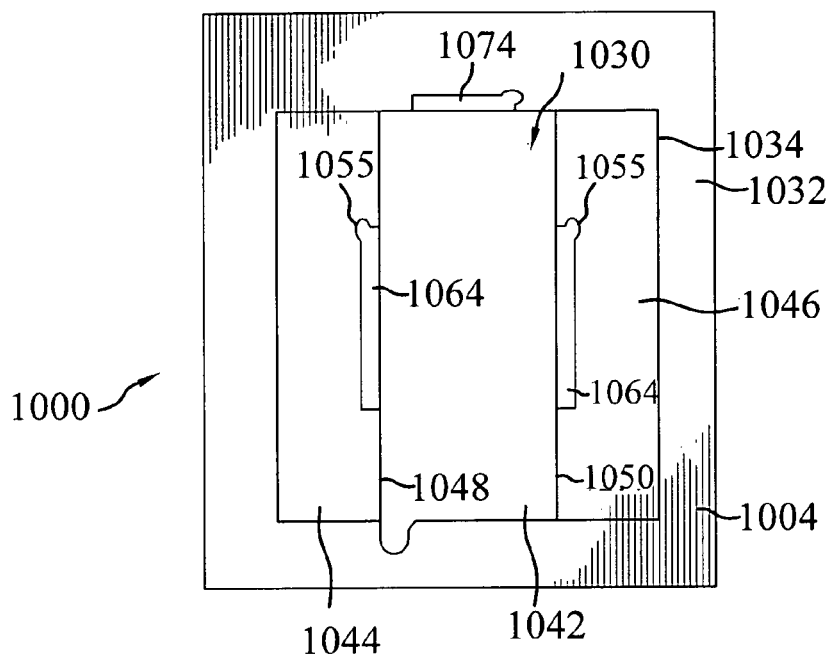
FIGS. 33 and 34 show the back of a label assembly according to still yet another embodiment of this invention.

FIG. 33 illustrates a label assembly 1000 according to another embodiment of this invention. Label assembly 1000 includes a back sheet 1004 and a face sheet 1002 with a layer of adhesive disposed there between.

The back sheet 1004 includes a removable panel 1030 defined in the back sheet surface 1032 by at least one tearable line of separation 1034 extending around the outer periphery of removable panel 1030. Similar to previously illustrated embodiments, the removable panel 1030 includes a center panel portion 1042 between two side panel portions 1044 and 1046, although the features of this embodiment can be applied to other label assembly configurations for other objects. The center panel portion 1042 is divided from each of the side panel portions 1044 and 1046 by a corresponding line of separation 1048 or 1050, respectively, cut within the back sheet 1004 only.

Figure 34:
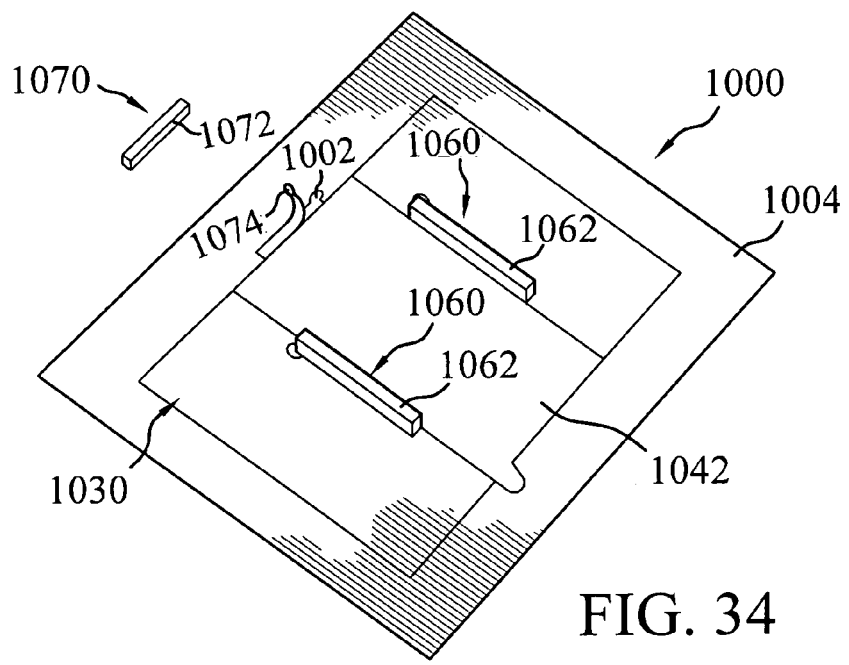

The registration structure 1060 in the embodiment of FIGS. 33 and 34 is embodied as a separate and independent registration element 1062 that is applied to the label assembly 1000 during use. The label assembly 1000 includes removable panel strips 1064 that are aligned with the center panel 1042 and removed by the user during use. The removable panel strips can include an optional corner starter flap, or removal tab, 1055 that is adapted to allow for easier removal by the user. Upon removing the removable panel strips 1064, the registration elements 1062, embodied in FIG. 34 as rectangular blocks, are placed over the exposed adhesive. The adhesive temporarily secures the elements 1062 in place along the center panel 1042 to form registration or guide rails for lowering the object to be labeled onto the adhesive material below the center panel 1042 after the center panel 1042 is removed.

In one embodiment of this invention, the registration elements are placed on the label assembly before the center panel 1042 is removed, so that the user can align the elements 1062. However, the elements can alternatively be applied after the center panel removal by aligning corners with the respective side panel 1044 or 1046. The exposed face sheet 1002 under the removable panel strips 1064 can also be marked with a line to facilitate proper placement of the elements 1062.

FIGS. 33 and 34 also show a similarly embodied alignment structure 1070 which includes an alignment element 1072 that temporarily adheres to adhesive exposed below a removable alignment strip 1074.

Various sizes, shapes, materials, numbers, and configurations are available for the registration/alignment elements and the corresponding removable panel/alignment strips of this invention. The registration/alignment elements can be a solid or hollow polyhedron or polyhedral tube having any suitable size and/or shape (e.g., triangular, square, or rounded prisms), but preferably have a flat surface to place on the exposed adhesive and a second flat surface perpendicular to or at an angle to the exposed adhesive material layer under the removable panel. Alternative numbers and placements of registration/alignment elements are also available. The registration/alignment elements can also be formed of any suitable material, such as wood, metal, and/or polymer, such as plastic or a foam or other spongy polymer material, and desirably have a surface that promotes removal from the adhesive after use.

The removable panel/alignment strips are desirably sized according to need and the size and shape of the registration/alignment elements. In one possible alternative, the registration/alignment elements are sized larger than the removable panel/alignment strips, and the back sheet includes a raised embossed line, such as shown in FIG. 6, which the user can use to align an edge of a tilted registration/alignment element followed by lowering the opposing edge onto the exposed adhesive. In another embodiment, the removable panel/alignment strips are formed as tabs connected to the back sheet by a fold line, such as discussed herein for embodiments of raisable tabs, and that are lifted about the fold line to expose the adhesive material. The folded tabs can act as a back stop that assist in placement and securing of the registration elements The removable panel/alignment strips can also be formed integral with the removable panel to be removed with the removable panel, and the edges of the side panel, an embossed line as discussed above, and/or a marking on the back side of the face sheet being used to align the registration elements.

The invention further includes a method for labeling an object with a label from the label assembly of this invention. As discussed above, the label assembly can be pre-printed or printable. If the label assembly is printable, the consumer can print custom images or text on the printable surface of the face sheet with a printer prior to labeling an object. The printed label assembly is placed on a surface with the face sheet downward on the surface. At least a portion of the removable panel in the back sheet, e.g., the entire panel or just a center panel portion, is removed, such as by using a starter flap, to expose the adhesive material on at least a first portion of a label shape cut in the face sheet. The registration structures and the alignment structures (if any) are raised or added either before or after the removable panel or a portion thereof is removed, and adhered to corresponding exposed adhesive material. A surface of the object (not shown) is placed over the adhesive material and kept in proper alignment using the registration structures and any alignment structure. At least a portion of the label shape is adhered to the object surface by placing the object on the exposed adhesive material while the object is against the registration structures and any alignment structure. Once the object surface is adhered, if any side panels are present they can be removed to expose the adhesive material on the remaining label shape. The side portions of the label shape can then be applied to the object, for example, by folding the side portions of the label shape along fold lines to wrap the side portions around side and/or back surfaces of the object.

In an alternative embodiment, the object is placed on the surface and the label assembly is placed over the object for labeling the object. In such an embodiment, the registration structures and any alignment structure can be preferably sized or positioned (e.g., adhered at an end surface instead of a side surface) according to a height of the object on the surface, to hold the label shape just over the object. The label shape can then be applied by pressing down on the label shape.

The invention also includes software for printing on the label shape. The software is executable on a data processor attached to a printer and includes templates for allowing the user to apply text or images in the desired location on the label shape (e.g., to avoid the view screen area). The software can include, on a recordable medium, numerous templates each corresponding to one label shape for a known consumer device.

Thus the invention provides a label assembly with a registration structure that promotes the desired straightened and/or central alignment of a label to an object. The label assembly of this invention allows for application of a label to an object without the need for a separate label application apparatus, while still providing the desired placement on the object, such as centered placement of a label on an MP3 player or cell phone.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A label assembly, comprising:
   a face sheet having a printable surface and an adhesive material coating a face sheet surface opposite the printable surface;
   a label shape defined in the face sheet by at least one first tearable line of separation;
   a back sheet disposed over the adhesive material;
   a removable panel defined in the back sheet by at least one second tearable line of separation and disposed over at least a portion of the label shape; and
   a registration structure that adheres to the adhesive material coating the face sheet surface opposite the printable surface to extend above the back sheet as a placement guide for an object to be labeled, wherein the registration structure is adhered to an exposed portion of the adhesive material that is adjacent to the portion of the label shape, the exposed portion is exposed from under a portion of the back sheet upon removal of the portion of the back sheet from the adhesive material.

2. The label assembly according to claim 1, wherein the registration structure comprises a three-dimensional shape.

3. The label assembly according to claim 1, wherein the registration structure comprises a box shape.

4. The label assembly according to claim 1, wherein the registration structure comprises a polyhedron or polyhedral tube.

5. The label assembly according to claim 1, further comprising an alignment structure adherable to an exposed portion of the adhesive material that is adjacent to the portion of the label shape, wherein the registration structure is adherable along a first side of the removable panel and the alignment structure is adherable along a second side of the removable panel that extends at an angle to the first side.

6. The label assembly according to claim 5, wherein the alignment structure comprises a polyhedron or polyhedral tube.

7. The label assembly according to claim 1, wherein the registration structure comprises a tab raisable above the back sheet to provide the exposed adhesive material, the tab defined in the back sheet at least partially by at least one third tearable line of separation and aligned with at least one of a portion of the label shape or the removable panel, and the tab connected to the back sheet by a fold line.

8. The label assembly according to claim 7, wherein the tab is cut into the back sheet and is not cut into the face sheet, wherein the tab is raisable by folding outward above the back sheet.

9. The label assembly according to claim 7, further comprising a second removable panel that includes the tab.

10. The label assembly according to claim 7, further comprising a second removable panel, and the tab is connected to the second removable panel by the fold line.

11. The label assembly according to claim 7, further comprising a plurality of tabs each defined by at least one tearable line of separation and aligned with a portion of the label shape, each of the plurality of tabs raisable above the back sheet.

12. The label assembly according to claim 7, wherein the tab comprises more than one tab fold line defining at least two foldable portions.

13. The label assembly according to claim 12, wherein the at least two foldable portion are foldable to form the tab as a polyhedral tube.

14. The label assembly according to claim 12, wherein each of the tab fold lines of the tab comprises a perforated fold line.

15. The label assembly according to claim 12, wherein one of the tab fold lines is aligned with and abuts a side edge of the removable panel.

16. The label assembly according to claim 1, further comprising a removable panel strip defined in the back sheet by at least one third tearable line of separation, aligned with and abutting the removable panel, and removable to provide the exposed adhesive material.

17. The label assembly according to claim 16, wherein the registration structure comprises a registration element that is separate and independent from the face sheet and back sheet, and adherable to the exposed adhesive material.

18. The label assembly according to claim 17, wherein the registration element comprises a polyhedron or polyhedral tube.

19. The label assembly according to claim 17, wherein the registration element is formed from wood or a polymer material.

20. A method for labeling an object with a label according to claim 1, the method comprising:
- providing the label assembly;
- exposing a portion of the adhesive material on a portion of the face sheet;
- adhering a registration structure to the exposed portion of the adhesive material;
- removing the removable panel from the back sheet to expose at least a portion of the label shape;
- aligning the object over the exposed label shape using the registration structure;
- adhering the object to the exposed label shape; and
- removing the object with the adhered label shape from the label assembly.

21. The label assembly according to claim 1, wherein the registration structure comprises a surface extending outward at an angle from the face sheet surface opposite the printable surface when adhered to the adhesive material, wherein the surface contacts an object and aligns the object with the label shape during labeling of the object with the label shape.

* * * * *